(12) United States Patent
Kirby et al.

(10) Patent No.: US 8,487,478 B2
(45) Date of Patent: Jul. 16, 2013

(54) WIRELESS POWER TRANSFER FOR APPLIANCES AND EQUIPMENTS

(75) Inventors: Miles A. Kirby, San Diego, CA (US); Matthew S. Grob, La Jolla, CA (US); Ernest T. Ozaki, Poway, CA (US); Paul E. Jacobs, La Jolla, CA (US); William H. Von Novak, San Diego, CA (US); Alireza Hormoz Mohammadian, San Diego, CA (US); Stanley S. Toncich, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 211 days.

(21) Appl. No.: 12/267,041

(22) Filed: Nov. 7, 2008

(65) Prior Publication Data

US 2009/0284245 A1    Nov. 19, 2009

Related U.S. Application Data

(60) Provisional application No. 61/053,000, filed on May 13, 2008, provisional application No. 61/053,004, filed on May 13, 2008, provisional application No. 61/053,008, filed on May 13, 2008, provisional application No. 61/053,010, filed on May 13, 2008, provisional application No. 61/053,012, filed on May 13, 2008, provisional application No. 61/053,015, filed on May 13, 2008, provisional application No. 61/060,735, filed on Jun. 11, 2008, provisional application No. 61/060,738, filed on Jun. 11, 2008, provisional application No. 61/060,741, filed on Jun. 11, 2008, provisional application No. 61/081,332, filed on Jul. 16, 2008.

(51) Int. Cl.
*H01F 21/00* (2006.01)
*H01F 38/14* (2006.01)

(52) U.S. Cl.
USPC ............................................................ 307/104

(58) Field of Classification Search
USPC ............................................................ 307/104
See application file for complete search history.

(56) References Cited

U.S. PATENT DOCUMENTS 3,633,109 A    1/1972  Schulz
4,802,080 A    1/1989  Bossi et al.
(Continued)

FOREIGN PATENT DOCUMENTS

CN    1460226 A    12/2003
CN    1722521 A    1/2006
(Continued)

OTHER PUBLICATIONS

International Search Report and Written Opinion—PCT/US2009/043515—International Search Authority—European Patent Office—Nov. 19, 2009.

*Primary Examiner* — Adi Amrany
(74) *Attorney, Agent, or Firm* — Knobbe, Martens, Olson & Bear LLP

(57) ABSTRACT

Exemplary embodiments are directed to wireless power transfer. A transmitting device or a receiving device for use in a wireless transfer system may be equipment or a household appliance. The transmitting device includes a transmit antenna to wirelessly transfer power to a receive antenna by generating a near field radiation within a coupling-mode region. An amplifier applies an RF signal to the transmit antenna. A presence detector detects a presence of a receiver device within the coupling-mode region. A controller adjusts a power output of the amplifier responsive to the presence of a receiver device. The presence detector may also detect a human presence. The power output may be adjusted at or below the regulatory level when the presence signal indicates human presence and above a regulatory level when the presence signal indicates human absence.

27 Claims, 17 Drawing Sheets

U.S. PATENT DOCUMENTS

| | | | |
|---|---|---|---|
| 5,539,394 A | 7/1996 | Cato et al. | |
| 5,956,626 A * | 9/1999 | Kaschke et al. | 455/115.1 |
| 5,963,144 A | 10/1999 | Kruest | |
| 6,195,562 B1 * | 2/2001 | Pirhonen et al. | 455/553.1 |
| 6,344,828 B1 | 2/2002 | Grantz et al. | |
| 6,600,931 B2 | 7/2003 | Sutton et al. | |
| 6,664,770 B1 | 12/2003 | Bartels | |
| 6,683,438 B2 | 1/2004 | Park et al. | |
| 6,690,264 B2 | 2/2004 | Dalglish | |
| 6,760,578 B2 | 7/2004 | Rotzoll | |
| 6,809,498 B2 | 10/2004 | Nakamura et al. | |
| 6,853,629 B2 | 2/2005 | Alamouti et al. | |
| 6,906,495 B2 | 6/2005 | Cheng et al. | |
| 6,967,462 B1 | 11/2005 | Landis | |
| 6,970,142 B1 | 11/2005 | Pleva et al. | |
| 7,069,086 B2 * | 6/2006 | Von Arx | 607/60 |
| 7,142,811 B2 | 11/2006 | Terranova et al. | |
| 7,146,139 B2 * | 12/2006 | Nevermann | 455/115.1 |
| 7,164,255 B2 | 1/2007 | Hui | |
| 7,243,855 B2 | 7/2007 | Matsumoto et al. | |
| 7,248,841 B2 | 7/2007 | Agee et al. | |
| 7,378,817 B2 | 5/2008 | Calhoon et al. | |
| 7,382,260 B2 | 6/2008 | Agarwal et al. | |
| 7,382,636 B2 | 6/2008 | Baarman et al. | |
| 7,443,057 B2 * | 10/2008 | Nunally | 307/149 |
| 7,478,108 B2 * | 1/2009 | Townsend et al. | 1/1 |
| 7,499,722 B2 * | 3/2009 | McDowell et al. | 455/522 |
| 7,521,890 B2 * | 4/2009 | Lee et al. | 320/108 |
| 7,538,666 B2 * | 5/2009 | Campman | 340/539.13 |
| 7,539,465 B2 | 5/2009 | Quan | |
| 7,554,316 B2 * | 6/2009 | Stevens et al. | 323/355 |
| 7,561,050 B2 | 7/2009 | Bhogal et al. | |
| 7,565,108 B2 | 7/2009 | Kotola et al. | |
| 7,576,514 B2 * | 8/2009 | Hui | 320/108 |
| 7,576,657 B2 * | 8/2009 | Duron et al. | 340/572.7 |
| 7,579,913 B1 | 8/2009 | Cheng et al. | |
| 7,605,496 B2 * | 10/2009 | Stevens et al. | 307/17 |
| 7,609,157 B2 * | 10/2009 | McFarland | 340/539.13 |
| 7,626,544 B2 * | 12/2009 | Smith et al. | 342/386 |
| 7,629,886 B2 * | 12/2009 | Steeves | 340/572.1 |
| 7,642,918 B2 | 1/2010 | Kippelen et al. | |
| 7,646,343 B2 | 1/2010 | Shtrom et al. | |
| 7,663,490 B2 * | 2/2010 | Dishongh | 340/572.1 |
| 7,675,403 B2 | 3/2010 | Quan et al. | |
| 7,741,734 B2 | 6/2010 | Joannopoulos et al. | |
| 7,778,224 B2 | 8/2010 | Hayashi et al. | |
| 7,792,553 B2 * | 9/2010 | Fukui et al. | 455/574 |
| 7,793,121 B2 * | 9/2010 | Lawther et al. | 713/300 |
| 7,812,481 B2 | 10/2010 | Iisaka et al. | |
| 7,825,543 B2 | 11/2010 | Karalis et al. | |
| 7,831,757 B2 * | 11/2010 | Habuto et al. | 710/303 |
| 7,868,837 B2 | 1/2011 | Yun et al. | |
| 7,952,322 B2 * | 5/2011 | Partovi et al. | 320/108 |
| 8,004,118 B2 | 8/2011 | Kamijo et al. | |
| 8,035,255 B2 * | 10/2011 | Kurs et al. | 307/104 |
| 8,073,387 B2 | 12/2011 | Maslennikov et al. | |
| 8,115,448 B2 * | 2/2012 | John | 320/108 |
| 2002/0154705 A1 | 10/2002 | Walton et al. | |
| 2004/0002835 A1 * | 1/2004 | Nelson | 702/188 |
| 2004/0041669 A1 | 3/2004 | Kawai | |
| 2004/0130916 A1 | 7/2004 | Baarman | |
| 2004/0166869 A1 | 8/2004 | Laroia et al. | |
| 2004/0180637 A1 | 9/2004 | Nagai et al. | |
| 2004/0227057 A1 | 11/2004 | Tuominen et al. | |
| 2005/0068019 A1 | 3/2005 | Nakamura et al. | |
| 2005/0127867 A1 * | 6/2005 | Calhoon et al. | 320/108 |
| 2005/0131495 A1 * | 6/2005 | Parramon et al. | 607/61 |
| 2005/0219132 A1 | 10/2005 | Charrat | |
| 2005/0225437 A1 | 10/2005 | Shiotsu et al. | |
| 2006/0084392 A1 | 4/2006 | Marholev et al. | |
| 2006/0114102 A1 | 6/2006 | Chang et al. | |
| 2006/0184705 A1 * | 8/2006 | Nakajima | 710/303 |
| 2006/0197652 A1 | 9/2006 | Hild et al. | |
| 2006/0202665 A1 | 9/2006 | Hsu | |
| 2006/0220863 A1 | 10/2006 | Koyama | |
| 2006/0244568 A1 | 11/2006 | Tong et al. | |
| 2007/0001816 A1 * | 1/2007 | Lindley et al. | 340/10.34 |
| 2007/0004456 A1 | 1/2007 | Shimada | |
| 2007/0017804 A1 | 1/2007 | Myrtveit et al. | |
| 2007/0021140 A1 * | 1/2007 | Keyes et al. | 455/522 |
| 2007/0026799 A1 * | 2/2007 | Wang et al. | 455/41.2 |
| 2007/0072474 A1 | 3/2007 | Beasley et al. | |
| 2007/0080804 A1 | 4/2007 | Hirahara et al. | |
| 2007/0091006 A1 | 4/2007 | Thober et al. | |
| 2007/0158438 A1 | 7/2007 | Fukuda et al. | |
| 2007/0182367 A1 | 8/2007 | Partovi | |
| 2007/0279002 A1 | 12/2007 | Partovi | |
| 2007/0287508 A1 * | 12/2007 | Telefus | 455/572 |
| 2007/0296393 A1 | 12/2007 | Malpas et al. | |
| 2008/0014897 A1 | 1/2008 | Cook et al. | |
| 2008/0030324 A1 * | 2/2008 | Bekritsky et al. | 340/539.22 |
| 2008/0054638 A1 * | 3/2008 | Greene et al. | 290/1 R |
| 2008/0067874 A1 | 3/2008 | Tseng | |
| 2008/0091350 A1 * | 4/2008 | Smith et al. | 701/213 |
| 2008/0114255 A1 * | 5/2008 | Schwartz et al. | 600/474 |
| 2008/0116847 A1 * | 5/2008 | Loke et al. | 320/108 |
| 2008/0211320 A1 * | 9/2008 | Cook et al. | 307/149 |
| 2008/0242337 A1 | 10/2008 | Sampath et al. | |
| 2008/0258679 A1 | 10/2008 | Manico et al. | |
| 2009/0015075 A1 * | 1/2009 | Cook et al. | 307/149 |
| 2009/0031069 A1 | 1/2009 | Habuto et al. | |
| 2009/0045772 A1 | 2/2009 | Cook et al. | |
| 2009/0058189 A1 | 3/2009 | Cook et al. | |
| 2009/0058361 A1 * | 3/2009 | John | 320/128 |
| 2009/0072782 A1 * | 3/2009 | Randall | 320/107 |
| 2009/0096413 A1 * | 4/2009 | Partovi et al. | 320/108 |
| 2009/0102292 A1 | 4/2009 | Cook et al. | |
| 2009/0127937 A1 * | 5/2009 | Widmer et al. | 307/149 |
| 2009/0134712 A1 | 5/2009 | Cook et al. | |
| 2009/0243397 A1 | 10/2009 | Cook et al. | |
| 2009/0284082 A1 | 11/2009 | Mohammadian | |
| 2009/0284218 A1 | 11/2009 | Mohammadian et al. | |
| 2009/0284220 A1 | 11/2009 | Toncich et al. | |
| 2009/0284227 A1 * | 11/2009 | Mohammadian et al. | 320/137 |
| 2009/0284369 A1 | 11/2009 | Toncich et al. | |
| 2009/0286470 A1 | 11/2009 | Mohammadian et al. | |
| 2009/0286475 A1 | 11/2009 | Toncich et al. | |
| 2009/0286476 A1 | 11/2009 | Toncich et al. | |
| 2010/0038970 A1 | 2/2010 | Cook et al. | |
| 2010/0039066 A1 | 2/2010 | Yuan et al. | |
| 2010/0081378 A1 | 4/2010 | Kawamura | |
| 2010/0148939 A1 | 6/2010 | Yamada et al. | |
| 2010/0181841 A1 * | 7/2010 | Azancot et al. | 307/104 |
| 2010/0323642 A1 | 12/2010 | Morita | |
| 2010/0328044 A1 | 12/2010 | Waffenschmidt et al. | |
| 2011/0057606 A1 * | 3/2011 | Saunamaki | 320/108 |
| 2011/0133569 A1 | 6/2011 | Cheon et al. | |
| 2011/0176251 A1 | 7/2011 | Lee | |
| 2012/0007437 A1 | 1/2012 | Fells et al. | |

FOREIGN PATENT DOCUMENTS

| | | |
|---|---|---|
| CN | 1906863 A | 1/2007 |
| CN | 1912786 A | 2/2007 |
| CN | 1965324 A | 5/2007 |
| CN | 1996352 A | 7/2007 |
| CN | 101291268 A | 10/2008 |
| DE | 4004196 | 4/1991 |
| EP | 0689149 | 12/1995 |
| EP | 0831411 | 3/1998 |
| EP | 0962407 A1 | 12/1999 |
| EP | 0977304 A1 | 2/2000 |
| EP | 1022677 | 7/2000 |
| EP | 1050839 | 11/2000 |
| EP | 1298578 A1 | 4/2003 |
| EP | 1454769 A1 | 9/2004 |
| EP | 1585268 A2 | 10/2005 |
| EP | 1703435 | 9/2006 |
| EP | 1713145 | 10/2006 |
| EP | 1919091 | 5/2008 |
| GB | 2307379 | 5/1997 |
| GB | 2380359 | 4/2003 |
| GB | 2395627 | 5/2004 |
| GB | 2433178 | 6/2007 |
| JP | 59031054 U | 2/1984 |
| JP | 6112720 A | 4/1994 |
| JP | 9103037 A | 4/1997 |
| JP | 9147070 A | 6/1997 |

| | | | | | | |
|---|---|---|---|---|---|---|
| JP | 10240880 | A | 9/1998 | JP | 2006314181 A | 11/2006 |
| JP | 10295043 | A | 11/1998 | JP | 2007006029 A | 1/2007 |
| JP | 11025238 | A | 1/1999 | JP | 2007166379 A | 6/2007 |
| JP | 11188113 | A | 7/1999 | JP | 2008508842 A | 3/2008 |
| JP | 2000050534 | A | 2/2000 | JP | 2008104295 A | 5/2008 |
| JP | 2000057450 | A | 2/2000 | JP | 2010508007 A | 3/2010 |
| JP | 2000501263 | A | 2/2000 | KR | 20040072581 A | 8/2004 |
| JP | 2000067195 | A | 3/2000 | KR | 20050044538 A | 5/2005 |
| JP | 2000113127 | A | 4/2000 | KR | 20050105200 A | 11/2005 |
| JP | 2001238372 | A | 8/2001 | KR | 20070017804 A | 2/2007 |
| JP | 2001511574 | A | 8/2001 | KR | 20080036702 A | 4/2008 |
| JP | 2001291080 | A | 10/2001 | KR | 20110009229 A | 1/2011 |
| JP | 2002034169 | A | 1/2002 | TW | 546960 B | 8/2003 |
| JP | 2002050534 | A | 2/2002 | TW | 200820537 A | 5/2008 |
| JP | 2002513490 | A | 5/2002 | WO | WO9829969 | 7/1998 |
| JP | 2002529982 | A | 9/2002 | WO | WO9854912 | 12/1998 |
| JP | 2003224937 | A | 8/2003 | WO | WO9905658 A1 | 2/1999 |
| JP | 2004096589 | A | 3/2004 | WO | WO0027137 A1 | 5/2000 |
| JP | 2004135455 | A | 4/2004 | WO | WO0227682 | 4/2002 |
| JP | 2004159456 | A | 6/2004 | WO | WO03079524 A2 | 9/2003 |
| JP | 2004526236 | A | 8/2004 | WO | WO2004032349 | 4/2004 |
| JP | 2004297779 | A | 10/2004 | WO | WO2004055654 A2 | 7/2004 |
| JP | 2004306558 | A | 11/2004 | WO | WO2004068726 A2 | 8/2004 |
| JP | 2004355212 | A | 12/2004 | WO | WO2004073150 A1 | 8/2004 |
| JP | 2005135455 | A | 5/2005 | WO | WO2004073166 A2 | 8/2004 |
| JP | 2005159607 | A | 6/2005 | WO | WO2005104022 | 11/2005 |
| JP | 2005204493 | A | 7/2005 | WO | WO2006011769 A1 | 2/2006 |
| JP | 2005520428 | A | 7/2005 | WO | 2006068416 A1 | 6/2006 |
| JP | 2005208754 | A | 8/2005 | WO | WO2007044144 | 4/2007 |
| JP | 2005303697 | A | 10/2005 | WO | 2007084717 A2 | 7/2007 |
| JP | 2006510101 | A | 3/2006 | WO | WO2007138690 A1 | 12/2007 |
| JP | 2006141170 | A | 6/2006 | WO | WO2008050260 A1 | 5/2008 |
| JP | 2006149168 | A | 6/2006 | WO | WO2009140223 | 11/2009 |
| JP | 2006517378 | A | 7/2006 | | | |
| JP | 2006295905 | A | 10/2006 | | | |

* cited by examiner

*PPT - Page 89*

WIRELESS POWER TRANSFER FOR APPLIANCES AND EQUIPMENTS

CLAIM OF PRIORITY UNDER 35 U.S.C. §119

This application claims priority under 35 U.S.C. §119(e) to:

U.S. Provisional Patent Application 61/060,735 entitled "REVERSE LINK SIGNALING VIA RECEIVE ANTENNA IMPEDANCE MODULATION" filed on Jun. 11, 2008;

U.S. Provisional Patent Application 61/060,738 entitled "SIGNALING CHARGING IN WIRELESS POWER ENVIRONMENT" filed on Jun. 11, 2008;

U.S. Provisional Patent Application 61/053,008 entitled "ADAPTIVE TUNING MECHANISM FOR WIRELESS POWER TRANSFER" filed on May 13, 2008;

U.S. Provisional Patent Application 61/053,010 entitled "EFFICIENT POWER MANAGEMENT SCHEME FOR WIRELESS POWER CHARGING SYSTEMS" filed on May 13, 2008;

U.S. Provisional Patent Application 61/060,741 entitled "TRANSMIT POWER CONTROL FOR A WIRELESS CHARGING SYSTEM" filed on Jun. 11, 2008;

U.S. Provisional Patent Application 61/053,000 entitled "REPEATERS FOR ENHANCEMENT OF WIRELESS POWER TRANSFER" filed on May 13, 2008;

U.S. Provisional Patent Application 61/053,004 entitled "WIRELESS POWER TRANSFER FOR APPLIANCES AND EQUIPMENTS" filed on May 13, 2008;

U.S. Provisional Patent Application 61/081,332 entitled "WIRELESS POWER TRANSFER USING NEGATIVE RESISTANCE" filed on Jul. 16, 2008;

U.S. Provisional Patent Application 61/053,012 entitled "EMBEDDED RECEIVE ANTENNA FOR WIRELESS POWER TRANSFER" filed on May 13, 2008; and U.S. Provisional Patent Application 61/053,015 entitled "PLANAR LARGE AREA WIRELESS CHARGING SYSTEM" filed on May 13, 2008.

REFERENCE TO CO-PENDING APPLICATIONS FOR PATENT

This application is also related to the following applications, which are assigned to the assignee hereof and filed on even date herewith, the disclosures of which are incorporated herein in their entirety by reference.

U.S. patent application Ser. No. 12/266,520 entitled "REPEATERS FOR ENHANCEMENT OF WIRELESS POWER TRANSFER."

U.S. patent application Ser. No. 12/266,522 entitled "METHOD AND APPARATUS FOR ADAPTIVE TUNING OF WIRELESS POWER TRANSFER."

U.S. patent application Ser. No. 12/266,525 entitled "METHOD AND APPARATUS WITH NEGATIVE RESISTANCE IN WIRELESS POWER TRANSFERS."

BACKGROUND

Typically, each battery powered device such as a wireless electronic device requires its own charger and power source, which is usually an alternating current (AC) power outlet. Such a wired configuration becomes unwieldy when many devices need charging.

Approaches are being developed that use over-the-air or wireless power transmission between a transmitter and a receiver coupled to the electronic device to be charged. Such approaches generally fall into two categories. One is based on the coupling of plane wave radiation (also called far-field radiation) between a transmit antenna and a receive antenna on the device to be charged. The receive antenna collects the radiated power and rectifies it for charging the battery. Antennas are generally of resonant length in order to improve the coupling efficiency. This approach suffers from the fact that the power coupling falls off quickly with distance between the antennas. So charging over reasonable distances (e.g., less than 1 to 2 meters) becomes difficult. Additionally, since the transmitting system radiates plane waves, unintentional radiation can interfere with other systems if not properly controlled through filtering.

Other approaches to wireless energy transmission techniques are based on inductive coupling between a transmit antenna embedded, for example, in a "charging" mat or surface and a receive antenna (plus a rectifying circuit) embedded in the host electronic device to be charged. This approach has the disadvantage that the spacing between transmit and receive antennas must be very close (e.g., within thousandths of meters). Though this approach does have the capability to simultaneously charge multiple devices in the same area, this area is typically very small and requires the user to accurately locate the devices to a specific area. Therefore, there is a need to provide a wireless charging arrangement that accommodates flexible placement and orientation of transmit and receive antennas.

With wireless power transmission there is a need for systems and methods for adjusting the operating characteristics of the antennas to adapt to different circumstances and optimize power transfer characteristics.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The words "wireless power" is used herein to mean any form of energy associated with electric fields, magnetic fields, electromagnetic fields, or otherwise that is transmitted between from a transmitter to a receiver without the use of physical electromagnetic conductors.

Figure 1:
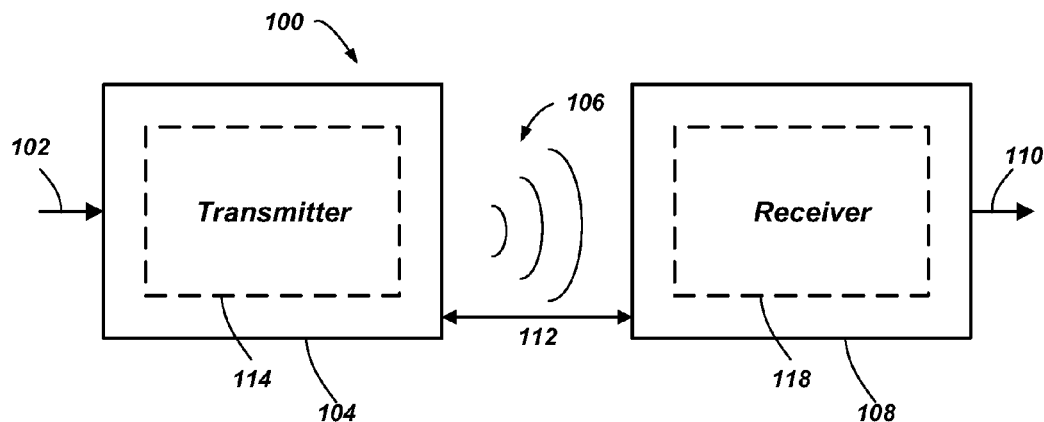
FIG. 1 shows a simplified block diagram of a wireless power transfer system.

FIG. 1 illustrates wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are exactly identical, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
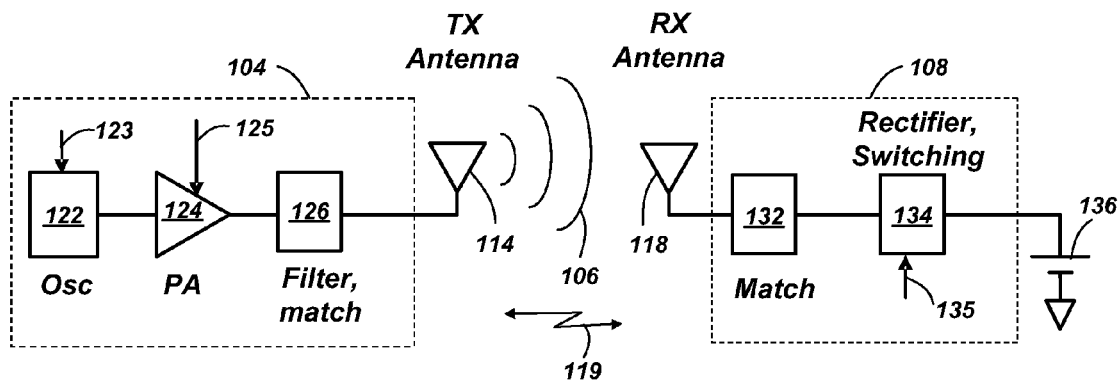
FIG. 2 shows a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate at a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver may include a matching circuit 132 and a rectifier and switching circuit to generate a DC power output to charge a battery 136 as shown in FIG. 2 or power a device coupled to the receiver (not shown). The matching circuit 132 may be included to match the impedance of the receiver 108 to the receive antenna 118.

Figure 3:
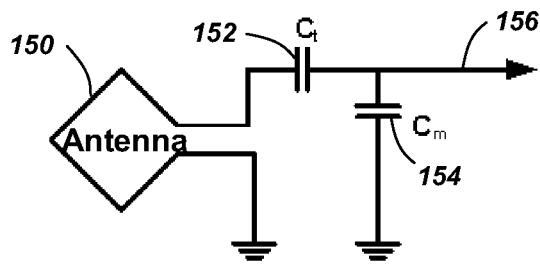
FIG. 3 shows a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Exemplary embodiments of the invention include coupling power between two antennas that are in the near-fields of each other. As stated, the near-field is an area around the antenna in which electromagnetic fields exist but may not propagate or radiate away from the antenna. They are typically confined to a volume that is near the physical volume of the antenna. In the exemplary embodiments of the invention, magnetic type antennas such as single and multi-turn loop antennas are used for both transmit (Tx) and receive (Rx) antenna systems since magnetic near-field amplitudes tend to be higher for magnetic type antennas in comparison to the electric near-fields of an electric-type antenna (e.g., a small dipole). This allows for potentially higher coupling between the pair. Furthermore, "electric" antennas (e.g., dipoles and monopoles) or a combination of magnetic and electric antennas is also contemplated.

The Tx antenna can be operated at a frequency that is low enough and with an antenna size that is large enough to achieve good coupling (e.g., >−4 dB) to a small Rx antenna at significantly larger distances than allowed by far field and inductive approaches mentioned earlier. If the Tx antenna is sized correctly, high coupling levels (e.g., −2 to −4 dB) can be achieved when the Rx antenna on a host device is placed within a coupling-mode region (i.e., in the near-field) of the driven Tx loop antenna.

Figure 4:
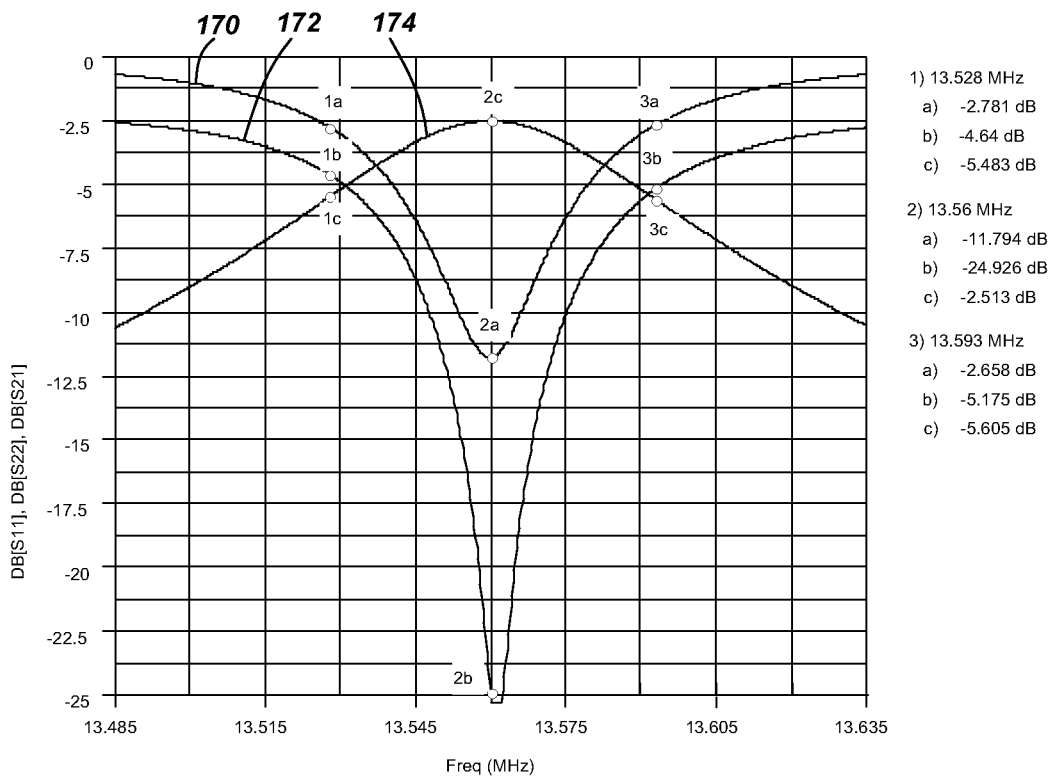
FIG. 4 shows simulation results indicating coupling strength between transmit and receive antennas.

FIG. 4 shows simulation results indicating coupling strength between transmit and receive antennas. Curves 170 and 172 indicate a measure of acceptance of power by the transmit and receive antennas, respectively. In other words, with a large negative number there is a very close impedance match and most of the power is accepted and, as a result, radiated by the transmit antenna. Conversely, a small negative number indicates that much of the power is reflected back from the antenna because there is not a close impedance match at the given frequency. In FIG. 4, the transmit antenna and the receive antenna are tuned to have a resonant frequency of about 13.56 MHz.

Curve 170 illustrates the amount of power transmitted from the transmit antenna at various frequencies. Thus, at points 1a and 3a, corresponding to about 13.528 MHz and 13.593 MHz, much of the power is reflected and not transmitted out of the transmit antenna. However, at point 2a, corresponding to about 13.56 MHz, it can be seen that a large amount of the power is accepted and transmitted out of the antenna.

Similarly, curve 172 illustrates the amount of power received by the receive antenna at various frequencies. Thus, at points 1b and 3b, corresponding to about 13.528 MHz and 13.593 MHz, much of the power is reflected and not conveyed through the receive antenna and into the receiver. However, at point 2b corresponding to about 13.56 MHz, it can be seen that a large amount of the power is accepted by the receive antenna and conveyed into the receiver.

Curve 174 indicates the amount of power received at the receiver after being sent from the transmitter through the transmit antenna, received through the receive antenna and conveyed to the receiver. Thus, at points 1c and 3c, corresponding to about 13.528 MHz and 13.593 MHz, much of the power sent out of the transmitter is not available at the receiver because (1) the transmit antenna rejects much of the power sent to it from the transmitter and (2) the coupling between the transmit antenna and the receive antenna is less efficient as the frequencies move away from the resonant frequency. However, at point 2c corresponding to about 13.56 MHz, it can be seen that a large amount of the power sent from the transmitter is available at the receiver, indicating a high degree of coupling between the transmit antenna and the receive antenna.

Figure 5A:
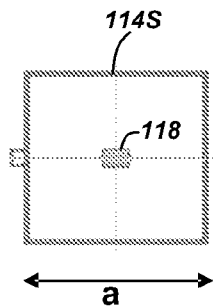
FIGS. 5A and 5B show layouts of loop antennas for transmit and receive antennas according to exemplary embodiments of the present invention.
Figure 5B:
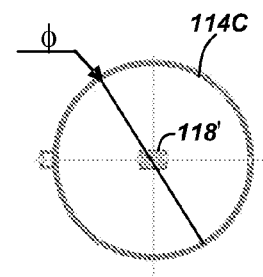

FIGS. 5A and 5B show layouts of loop antennas for transmit and receive antennas according to exemplary embodiments of the present invention. Loop antennas may be configured in a number of different ways, with single loops or multiple loops at wide variety of sizes. In addition, the loops may be a number of different shapes, such as, for example only, circular, elliptical, square, and rectangular. FIG. 5A illustrates a large square loop transmit antenna 114S and a small square loop receive antenna 118 placed in the same plane as the transmit antenna 114S and near the center of the transmit antenna 114S. FIG. 5B illustrates a large circular loop transmit antenna 114C and a small square loop receive antenna 118' placed in the same plane as the transmit antenna 114C and near the center of the transmit antenna 114C. The square loop transmit antenna 114S has side lengths of "a" while the circular loop transmit antenna 114C has a diameter of "Φ." For a square loop, it can be shown that there is an equivalent circular loop whose diameter may be defined as: $\Phi_{eq} = 4a/\pi$.

Figure 6:
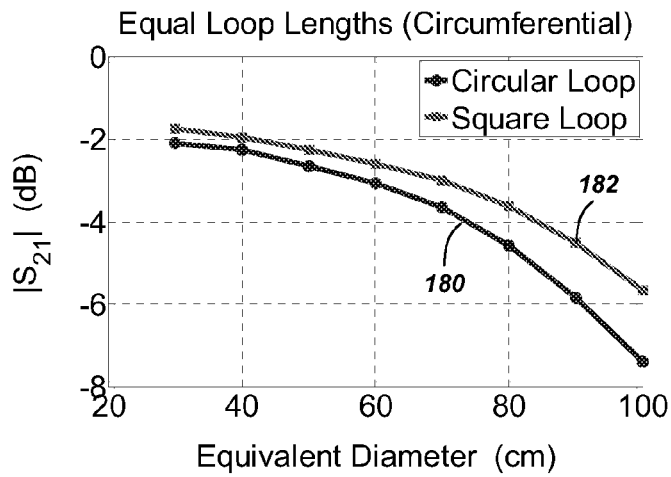
FIG. 6 shows simulation results indicating coupling strength between transmit and receive antennas relative to various circumference sizes for the square and circular transmit antennas illustrated in FIGS. 5A and 5B.

FIG. 6 shows simulation results indicating coupling strength between transmit and receive antennas relative to various circumferences for the square and circular transmit antennas illustrated in FIGS. 4A and 4B. Thus, curve 180 shows coupling strength between the circular loop transmit antennas 114C and the receive antenna 118 at various circumference sizes for the circular loop transmit antenna 114C. Similarly, curve 182 shows coupling strength between the square loop transmit antennas 114S and the receive antenna 118' at various equivalent circumference sizes for the transmit loop transmit antenna 114S.

Figure 7:
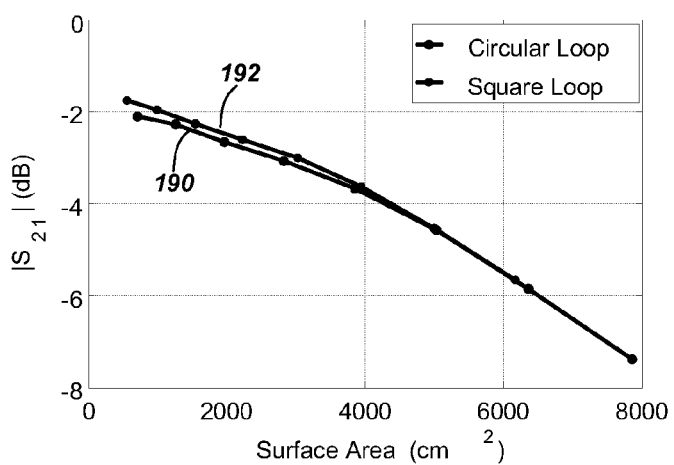
FIG. 7 shows simulation results indicating coupling strength between transmit and receive antennas relative to various surface areas for the square and circular transmit antennas illustrated in FIGS. 5A and 5B.

FIG. 7 shows simulation results indicating coupling strength between transmit and receive antennas relative to various surface areas for the square and circular transmit antennas illustrated in FIGS. 5A and 5B. Thus, curve 190 shows coupling strength between the circular loop transmit antennas 114C and the receive antenna 118 at various surface areas for the circular loop transmit antenna 114C. Similarly, curve 192 shows coupling strength between the square loop transmit antennas 114S and the receive antenna 118' at various surface areas for the transmit loop transmit antenna 114S.

Figure 8:
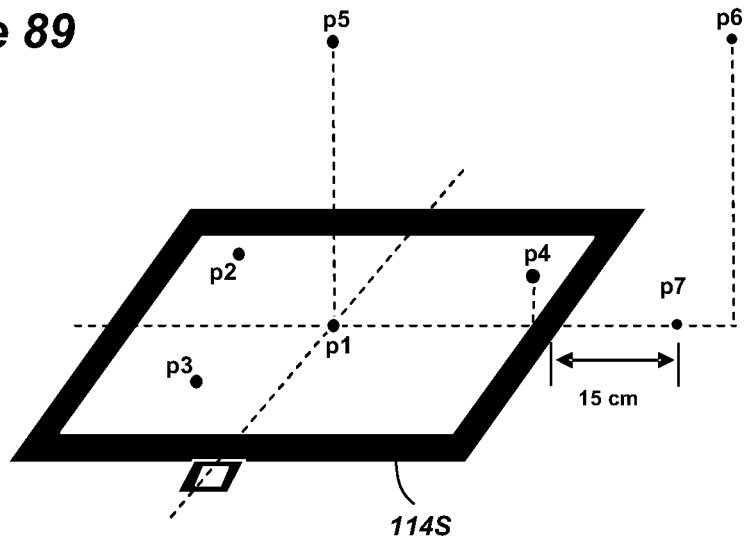
FIG. 8 shows various placement points for a receive antenna relative to a transmit antenna to illustrate coupling strengths in coplanar and coaxial placements.

FIG. 8 shows various placement points for a receive antenna relative to a transmit antenna to illustrate coupling strengths in coplanar and coaxial placements. "Coplanar," as used herein, means that the transmit antenna and receive antenna have planes that are substantially aligned (i.e., have surface normals pointing in substantially the same direction) and with no distance (or a small distance) between the planes of the transmit antenna and the receive antenna. "Coaxial," as used herein, means that the transmit antenna and receive antenna have planes that are substantially aligned (i.e., have surface normals pointing in substantially the same direction) and the distance between the two planes is not trivial and furthermore, the surface normal of the transmit antenna and the receive antenna lie substantially along the same vector, or the two normals are in echelon.

As examples, points p1, p2, p3, and p7 are all coplanar placement points for a receive antenna relative to a transmit antenna. As another example, point p5 and p6 are coaxial placement points for a receive antenna relative to a transmit antenna. The table below shows coupling strength (S21) and coupling efficiency (expressed as a percentage of power transmitted from the transmit antenna that reached the receive antenna) at the various placement points (p1-p7) illustrated in FIG. 8.

TABLE 1

| Position | Distance from plane (cm) | S21 efficiency (%) | Efficiency (TX DC power in to RX DC power out) |
|---|---|---|---|
| p1 | 0 | 46.8 | 28 |
| p2 | 0 | 55.0 | 36 |
| p3 | 0 | 57.5 | 35 |
| p4 | 2.5 | 49.0 | 30 |
| p5 | 17.5 | 24.5 | 15 |
| p6 | 17.5 | 0.3 | 0.2 |
| p7 | 0 | 5.9 | 3.4 |

As can be seen, the coplanar placement points p1, p2, and p3, all show relatively high coupling efficiencies. Placement point p7 is also a coplanar placement point, but is outside of the transmit loop antenna. While placement point p7 does not have a high coupling efficiency, it is clear that there is some coupling and the coupling-mode region extends beyond the perimeter of the transmit loop antenna.

Placement point p5 is coaxial with the transmit antenna and shows substantial coupling efficiency. The coupling efficiency for placement point p5 is not as high as the coupling efficiencies for the coplanar placement points. However, the coupling efficiency for placement point p5 is high enough that substantial power can be conveyed between the transmit antenna and a receive antenna in a coaxial placement.

Placement point p4 is within the circumference of the transmit antenna but at a slight distance above the plane of the transmit antenna in a position that may be referred to as an offset coaxial placement (i.e., with surface normals in substantially the same direction but at different locations) or offset coplanar (i.e., with surface normals in substantially the same direction but with planes that are offset relative to each other). From the table it can be seen that with an offset distance of 2.5 cm, placement point p4 still has relatively good coupling efficiency.

Placement point p6 illustrates a placement point outside the circumference of the transmit antenna and at a substantial distance above the plane of the transmit antenna. As can be seen from the table, placement point p7 shows little coupling efficiency between the transmit and receive antennas.

Figure 9:
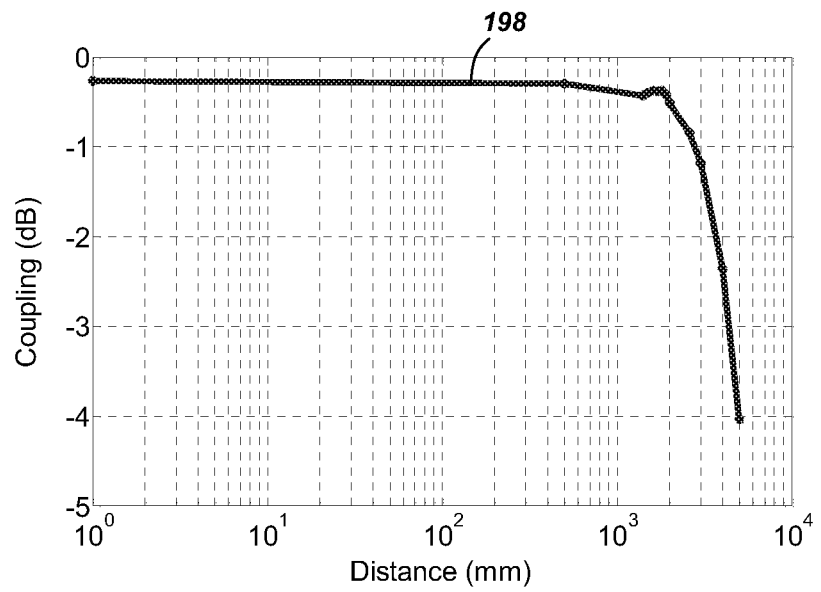
FIG. 9 shows simulation results indicating coupling strength for coaxial placement at various distances between the transmit and receive antennas.

FIG. 9 shows simulation results indicating coupling strength for coaxial placement at various distances between the transmit and receive antennas. The simulations for FIG. 9 are for square transmit and receive antennas in a coaxial placement, both with sides of about 1.2 meters and at a transmit frequency of 10 MHz. It can be seen that the coupling strength remains quite high and uniform at distances of less than about 0.5 meters.

Figure 10:
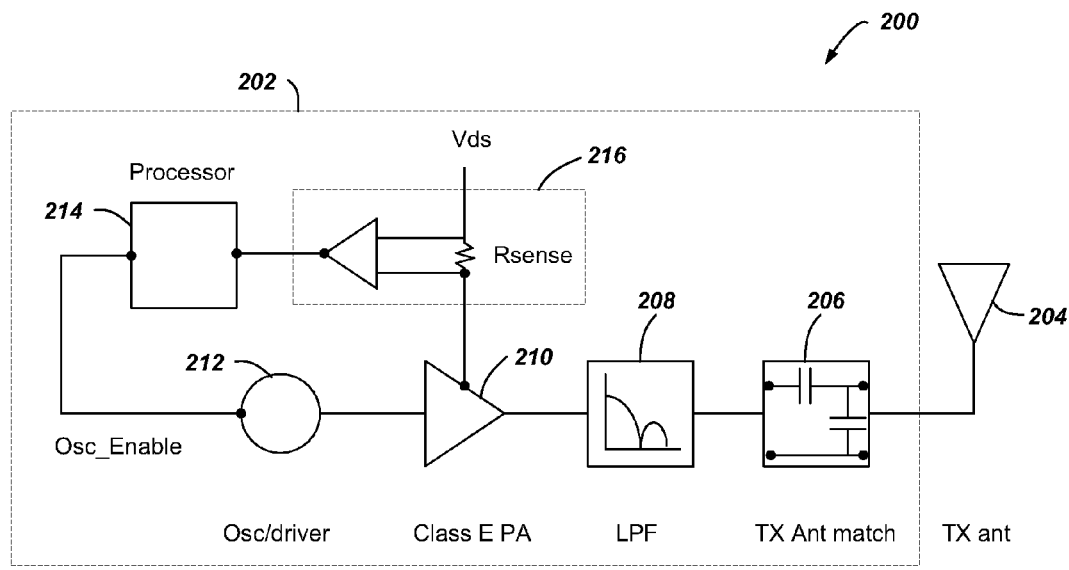
FIG. 10 is a simplified block diagram of a transmitter, in accordance with an exemplary embodiment of the present invention.

FIG. 10 is a simplified block diagram of a transmitter, in accordance with an exemplary embodiment of the present invention. A transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. By way of example, transmitter 200 may operate at the 13.56 MHz ISM band.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other embodiments may include different filter topologies, including but not limited to, notch filters that attenuate specific frequencies while passing others and may include an adaptive impedance match, that can be varied based on measurable transmit metrics, such as output power to the antenna or DC current draw by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 Watts.

Transmit circuitry 202 further includes a processor 214 for enabling the oscillator 212 during transmit phases (or duty cycles) for specific receivers, for adjusting the frequency of the oscillator, and for adjusting the output power level for implementing a communication protocol for interacting with neighboring devices through their attached receivers.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by processor 214 for use in determining whether to enable the oscillator 212 for transmitting energy to communicate with an active receiver.

Transmit antenna 204 may be implemented as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency. In an exemplary application where the transmit antenna 204 may be larger in diameter, or length of side if a square loop, (e.g., 0.50 meters) relative to the receive antenna, the transmit antenna 204 will not necessarily need a large number of turns to obtain a reasonable capacitance.

Figure 11:
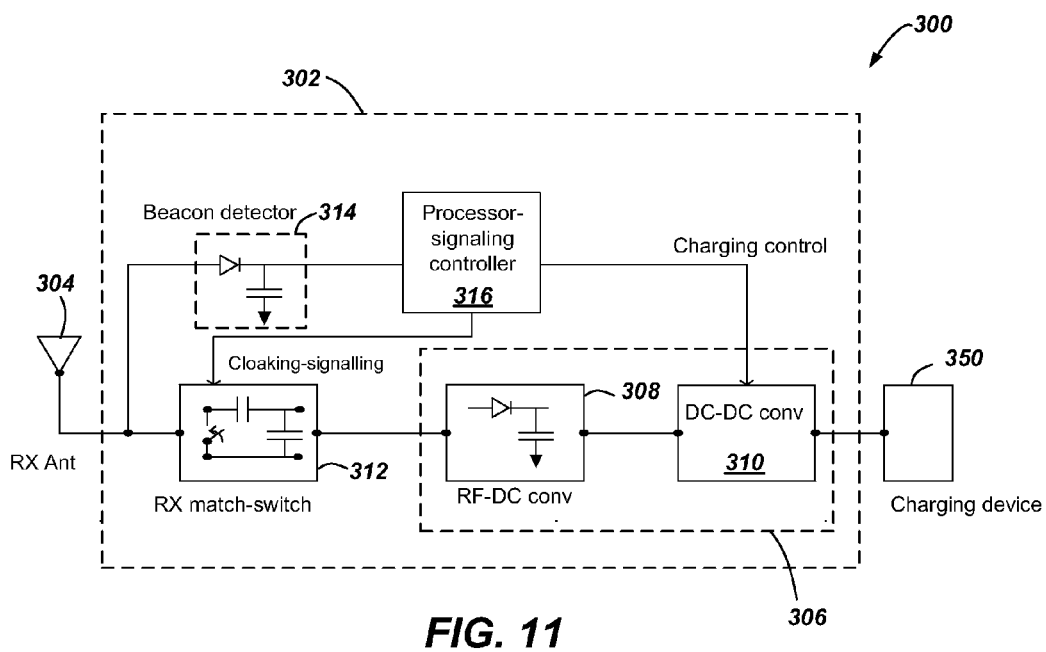
FIG. 11 is a simplified block diagram of a receiver, in accordance with an exemplary embodiment of the present invention.

FIG. 11 is a block diagram of a receiver, in accordance with an embodiment of the present invention. A receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or near the same frequency, as transmit antenna 204 (FIG. 10). Receive antenna 304 may be similarly dimensioned with transmit antenna 204 or may be differently sized based upon the dimensions of an associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2) as is explained more fully below. As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. A receiver may also be cloaked in order to eliminate coupling to other nearby receivers or to reduce loading on nearby transmitters. This "unloading" of a receiver is also known herein as a "cloaking." Furthermore, this switching between unloading and loading controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 μsec.

In an exemplary embodiment, communication between the transmitter and the receiver refers to a Device Sensing and Charging Control Mechanism, rather than conventional two-way communication. In other words, the transmitter uses on/off keying of the transmitted signal to adjust whether energy is available in the near-filed. The receivers interpret these changes in energy as a message from the transmitter. From the receiver side, the receiver uses tuning and de-tuning of the receive antenna to adjust how much power is being accepted from the near-field. The transmitter can detect this difference in power used from the near field and interpret these changes as a message from the receiver.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

Figure 12:
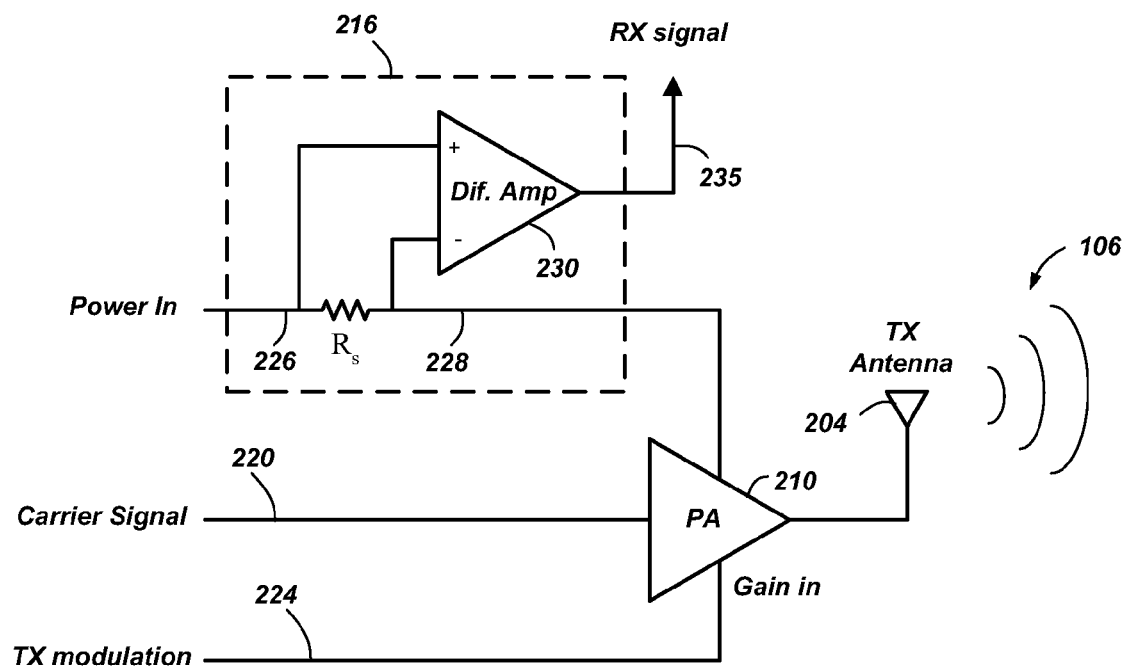
FIG. 12 shows a simplified schematic of a portion of transmit circuitry for carrying out messaging between a transmitter and a receiver.

FIG. 12 shows a simplified schematic of a portion of transmit circuitry for carrying out messaging between a transmitter and a receiver. In some exemplary embodiments of the present invention, a means for communication may be enabled between the transmitter and the receiver. In FIG. 12 a power amplifier 210 drives the transmit antenna 204 to generate the radiated field. The power amplifier is driven by a carrier signal 220 that is oscillating at a desired frequency for the transmit antenna 204. A transmit modulation signal 224 is used to control the output of the power amplifier 210.

The transmit circuitry can send signals to receivers by using an ON/OFF keying process on the power amplifier 210. In other words, when the transmit modulation signal 224 is asserted, the power amplifier 210 will drive the frequency of the carrier signal 220 out on the transmit antenna 204. When the transmit modulation signal 224 is negated, the power amplifier will not drive out any frequency on the transmit antenna 204.

The transmit circuitry of FIG. 12 also includes a load sensing circuit 216 that supplies power to the power amplifier 210 and generates a receive signal 235 output. In the load sensing circuit 216 a voltage drop across resistor $R_s$ develops between the power in signal 226 and the power supply 228 to the power amplifier 210. Any change in the power consumed by the power amplifier 210 will cause a change in the voltage drop that will be amplified by differential amplifier 230. When the transmit antenna is in coupled mode with a receive antenna in a receiver (not shown in FIG. 12) the amount of current drawn by the power amplifier 210 will change. In other words, if no coupled mode resonance exist for the transmit antenna 210, the power required to drive the radiated field will be first amount. If a coupled mode resonance exists, the amount of power consumed by the power amplifier 210 will go up because much of the power is being coupled into the receive antenna. Thus, the receive signal 235 can indicate the presence of a receive antenna coupled to the transmit antenna 235 and can also detect signals sent from the receive antenna, as explained below. Additionally, a change in receiver current draw will be observable in the transmitter's power amplifier current draw, and this change can be used to detect signals from the receive antennas, as explained below.

Figure 13A:
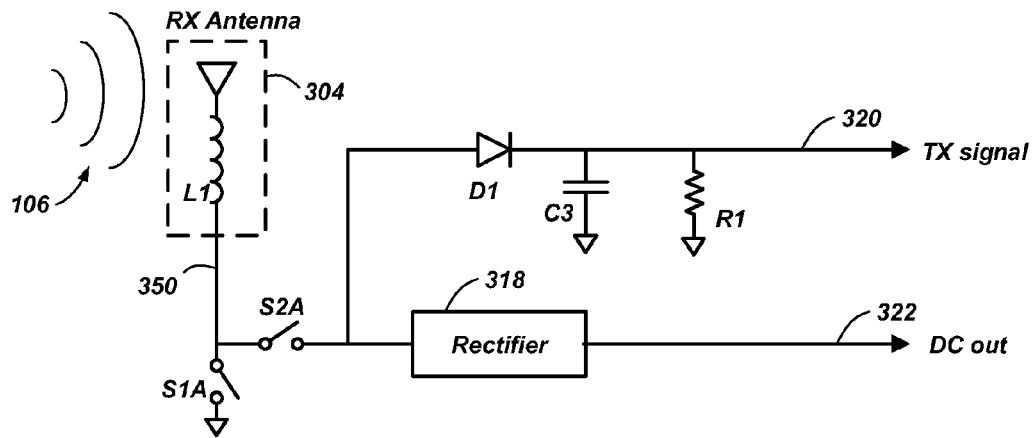
FIGS. 13A-13C shows a simplified schematic of a portion of receive circuitry in various states to illustrate messaging between a receiver and a transmitter.
Figure 13B:
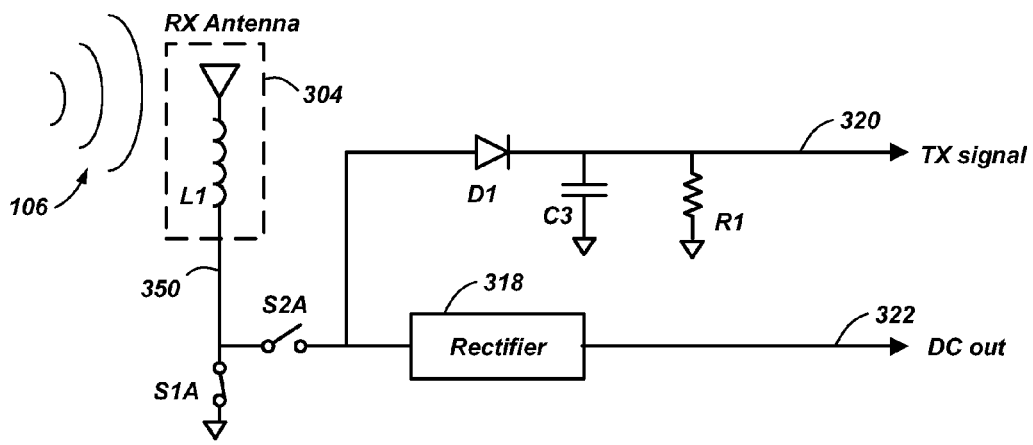
Figure 13C:
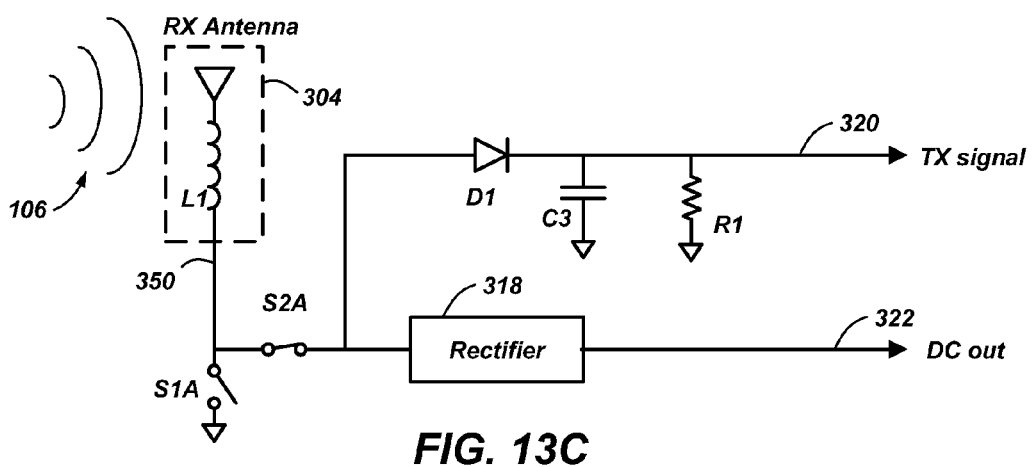

FIGS. 13A-13C shows a simplified schematic of a portion of receive circuitry in various states to illustrate messaging between a receiver and a transmitter. All of FIGS. 13A-13C show the same circuit elements with the difference being state of the various switches. A receive antenna 304 includes a characteristic inductance L1, which drives node 350. Node 350 is selectively coupled to ground through switch S1A. Node 350 is also selectively coupled to diode D1 and rectifier 318 through switch S1B. The rectifier 318 supplies a DC power signal 322 to a receive device (not shown) to power the receive device, charge a battery, or a combination thereof. The diode D1 is coupled to a transmit signal 320 which is filtered to remove harmonics and unwanted frequencies with capacitor C3 and resistor R1. Thus the combination of D1, C3, and R1 can generate a signal on the transmit signal 320 that mimics the transmit modulation generated by the transmit modulation signal 224 discussed above with reference to the transmitter in FIG. 12.

Exemplary embodiments of the invention includes modulation of the receive device's current draw and modulation of the receive antenna's impedance to accomplish reverse link signaling. With reference to both FIG. 13A and FIG. 12, as the power draw of the receive device changes, the load sensing circuit 216 detects the resulting power changes on the transmit antenna and from these changes can generate the receive signal 235.

In the embodiments of FIGS. 13A-13C, the current draw through the transmitter can be changed by modifying the state of switches S1A and S2A. In FIG. 13A, switch S1A and switch S2A are both open creating a "DC open state" and essentially removing the load from the transmit antenna 204. This reduces the current seen by the transmitter.

In FIG. 13B, switch S1A is closed and switch S2A is open creating a "DC short state" for the receive antenna 304. Thus the state in FIG. 13B can be used to increase the current seen in the transmitter.

In FIG. 13C, switch S1A is open and switch S2A is closed creating a normal receive mode (also referred to herein as a "DC operating state") wherein power can be supplied by the DC out signal 322 and a transmit signal 320 can be detected. In the state shown in FIG. 13C the receiver receives a normal amount of power, thus consuming more or less power from the transmit antenna than the DC open state or the DC short state.

Reverse link signaling may be accomplished by switching between the DC operating state (FIG. 13C) and the DC short state (FIG. 13B). Reverse link signaling also may be accomplished by switching between the DC operating state (FIG. 13C) and the DC open state (FIG. 13A).

Figure 14A:
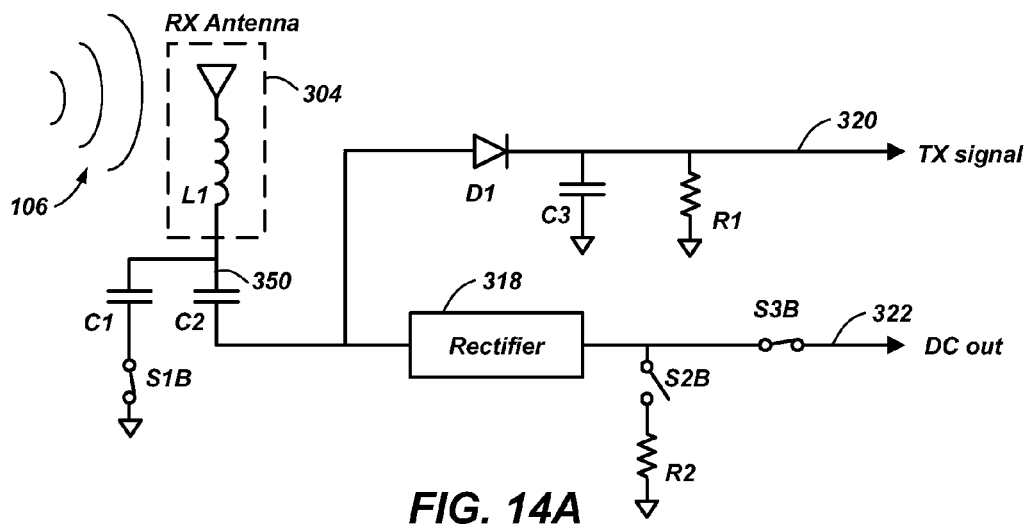
FIGS. 14A-14C shows a simplified schematic of a portion of alternative receive circuitry in various states to illustrate messaging between a receiver and a transmitter.
Figure 14B:
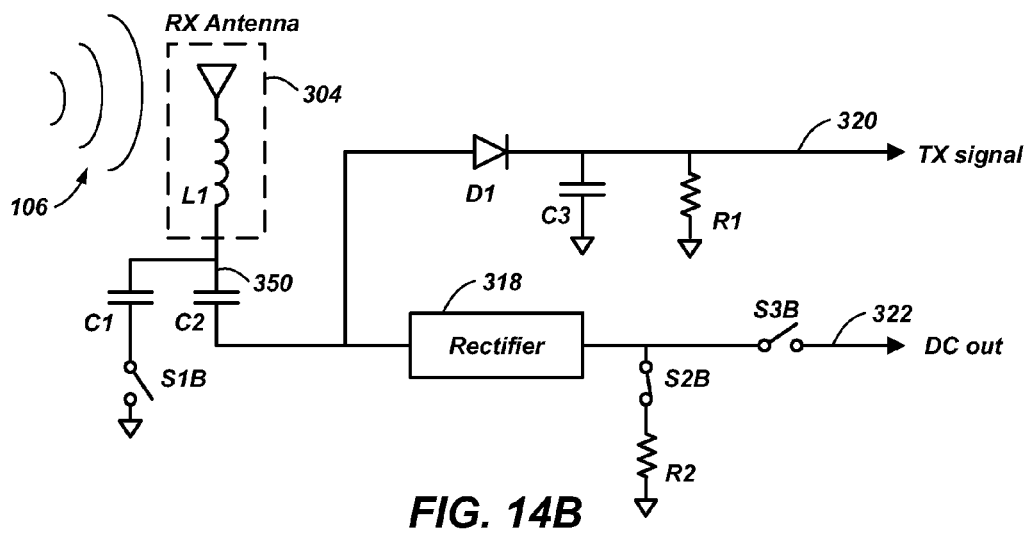
Figure 14C:
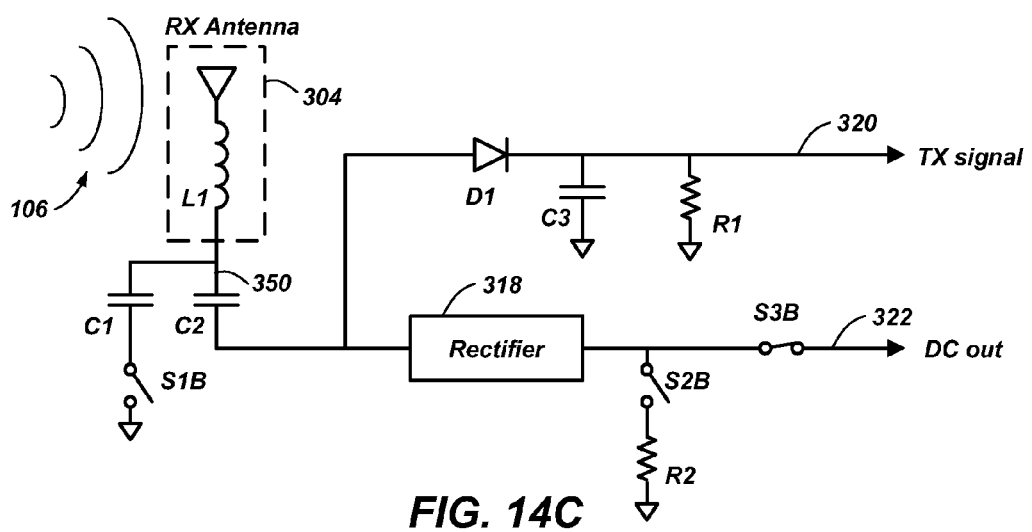

FIGS. 14A-14C shows a simplified schematic of a portion of alternative receive circuitry in various states to illustrate messaging between a receiver and a transmitter.

All of FIGS. 14A-14C show the same circuit elements with the difference being state of the various switches. A receive antenna 304 includes a characteristic inductance L1, which drives node 350. Node 350 is selectively coupled to ground through capacitor C1 and switch S1B. Node 350 is also AC coupled to diode D1 and rectifier 318 through capacitor C2. The diode D1 is coupled to a transmit signal 320 which is filtered to remove harmonics and unwanted frequencies with capacitor C3 and resistor R1. Thus the combination of D1, C3, and R1 can generate a signal on the transmit signal 320 that mimics the transmit modulation generated by the transmit modulation signal 224 discussed above with reference to the transmitter in FIG. 12.

The rectifier 318 is connected to switch S2B, which is connected in series with resistor R2 and ground. The rectifier 318 also is connected to switch S3B. The other side of switch S3B supplies a DC power signal 322 to a receive device (not shown) to power the receive device, charge a battery, or a combination thereof.

In FIGS. 13A-13C the DC impedance of the receive antenna 304 is changed by selectively coupling the receive antenna to ground through switch S1B. In contrast, in the embodiments of FIGS. 14A-14C, the impedance of the antenna can be modified to generate the reverse link signaling by modifying the state of switches S1B, S2B, and S3B to change the AC impedance of the receive antenna 304. In FIGS. 14A-14C the resonant frequency of the receive antenna 304 may be tuned with capacitor C2. Thus, the AC impedance of the receive antenna 304 may be changed by selectively coupling the receive antenna 304 through capacitor C1 using switch S1B, essentially changing the resonance circuit to a different frequency that will be outside of a range that will optimally couple with the transmit antenna. If the resonance frequency of the receive antenna 304 is near the resonant frequency of the transmit antenna, and the receive antenna 304 is in the near-field of the transmit antenna, a coupling mode may develop wherein the receiver can draw significant power from the radiated field 106.

In FIG. 14A, switch S1B is closed, which de-tunes the antenna and creates an "AC cloaking state," essentially "cloaking" the receive antenna 304 from detection by the transmit antenna 204 because the receive antenna does not resonate at the transmit antenna's frequency. Since the receive antenna will not be in a coupled mode, the state of switches S2B and S3B are not particularly important to the present discussion.

In FIG. 14B, switch S1B is open, switch S2B is closed, and switch S3B is open, creating a "tuned dummy-load state" for the receive antenna 304. Because switch S1B is open, capacitor C1 does not contribute to the resonance circuit and the receive antenna 304 in combination with capacitor C2 will be in a resonance frequency that may match with the resonant frequency of the transmit antenna. The combination of switch S3B open and switch S2B closed creates a relatively high current dummy load for the rectifier, which will draw more power through the receive antenna 304, which can be sensed by the transmit antenna. In addition, the transmit signal 320 can be detected since the receive antenna is in a state to receive power from the transmit antenna.

In FIG. 14C, switch S1B is open, switch S2B is open, and switch S3B is closed, creating a "tuned operating state" for the receive antenna 304. Because switch S1B is open, capacitor C1 does not contribute to the resonance circuit and the receive antenna 304 in combination with capacitor C2 will be in a resonance frequency that may match with the resonant frequency of the transmit antenna. The combination of switch S2B open and switch S3B closed creates a normal operating state wherein power can be supplied by the DC out signal 322 and a transmit signal 320 can be detected.

Reverse link signaling may be accomplished by switching between the tuned operating state (FIG. 14C) and the AC cloaking state (FIG. 14A). Reverse link signaling also may be accomplished by switching between the tuned dummy-load state (FIG. 14B) and the AC cloaking state (FIG. 14A). Reverse link signaling also may be accomplished by switching between the tuned operating state (FIG. 14C) and the tuned dummy-load state (FIG. 14B) because there will be a difference in the amount of power consumed by the receiver, which can be detected by the load sensing circuit in the transmitter.

Of course, those of ordinary skill in the art will recognize that other combinations of switches S1B, S2B, and S3B may be used to create cloaking, generate reverse link signaling and supplying power to the receive device. In addition, the switches S1A and S1B may be added to the circuits of FIGS. 14A-14C to create other possible combinations for cloaking, reverse link signaling, and supplying power to the receive device.

Thus, when in a coupled mode signals may be sent from the transmitter to the receiver, as discussed above with reference to FIG. 12. In addition, when in a coupled mode signals may be sent from the receiver to the transmitter, as discussed above with reference to FIGS. 13A-13C and 14A-14C.

Figure 15A:
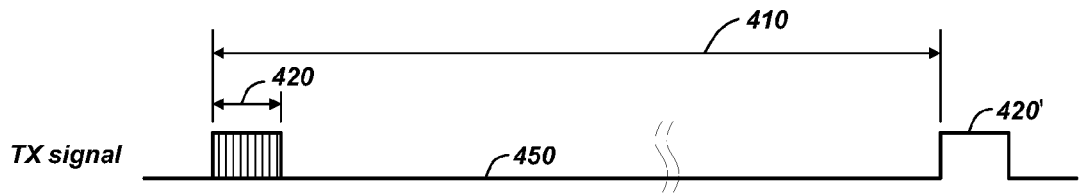
FIGS. 15A-15C are timing diagrams illustrating a messaging protocol for communication between a transmitter and a receiver.
Figure 15B:
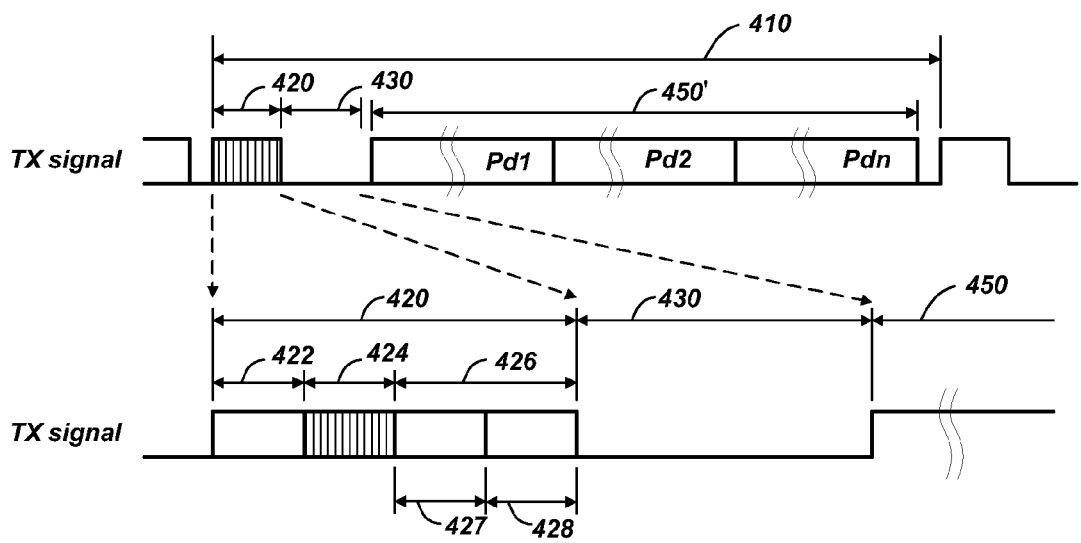
Figure 15C:
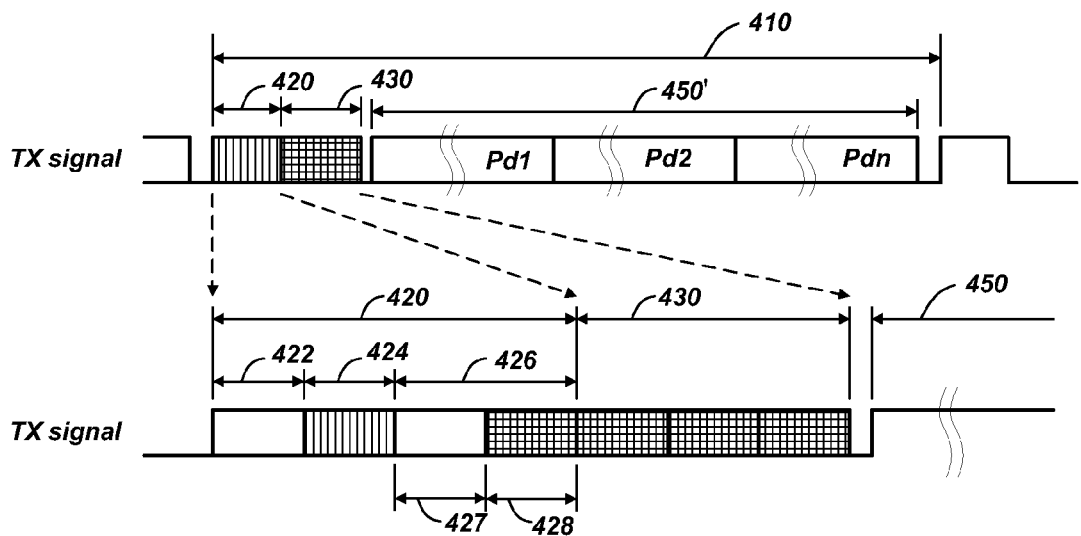

FIGS. 15A-15C are timing diagrams illustrating a messaging protocol for communication between a transmitter and a receiver using the signaling techniques discussed above. In one exemplary approach, signals from the transmitter to the receiver are referred to herein as a "forward link" and use a simple AM modulation between normal oscillation and no oscillation. Other modulation techniques are also contemplated. As a non-limiting example, a signal present may be interpreted as a 1 and no signal present may be interpreted as a 0.

Reverse link signaling is provided by modulation of power drawn by the receive device, which can be detected by the load sensing circuit in the transmitter. As a non-limiting example, higher power states may be interpreted as a 1 and lower power states may be interpreted as a 0. It should be noted that the transmitter must be on for the receiver to be able to perform the reverse link signaling. In addition, the receiver should not perform reverse link signaling during forward link signaling. Furthermore, if two receive devices attempt to perform reverse link signaling at the same time a collision may occur, which will make it difficult, if not impossible for the transmitter to decode a proper reverse link signal.

In the exemplary embodiment described herein, signaling is similar to a Universal Asynchronous Receive Transmit (UART) serial communication protocol with a start bit, a data byte, a parity bit and a stop bit. Of course, any serial communication protocol may be suitable for carrying the exemplary embodiment of the present invention described herein. For simplicity of description, and not as a limitation, the messaging protocol will be described such that the period for communicating each byte transmission is about 10 mS.

FIG. 15A illustrates the simplest, and lowest power form of the messaging protocol. A synchronization pulse 420 will be repeated every recurring period 410 (about one second in the exemplary embodiment). As a non-limiting example, the sync pulse on time may be about 40 mS. The recurring period 410 with at least a synchronization pulse 420 may be repeated indefinitely while the transmitter is on. Note that "synchronization pulse" is somewhat of a misnomer because the synchronization pulse 350 may be a steady frequency during the pulse period as illustrated by the "white" pulse 420'. The synchronization pulse 420 may also include signaling at the resonant frequency with the ON/OFF keying discussed above and as illustrated by the "hatched" pulse 420. FIG. 15A illustrates a minimal power state wherein power at the resonant frequency is supplied during the synchronization pulse 420 and the transmit antenna is off during a power period 450. All receive devices are allowed to receive power during the synchronization pulse 420.

FIG. 15B illustrates the recurring period 410 with a synchronization pulse 420, a reverse link period 430 and a power period 450' wherein the transmit antenna is on and supplying full power by oscillating at the resonant frequency and not performing any signaling. The upper timing diagram illustrates the entire recurring period 410 and the lower timing diagram illustrates an exploded view of the synchronization pulse 420 and the reverse link period 430. The power period 450' may be segmented into different periods for multiple receive devices as is explained below. FIG. 15B shows three power segments Pd1, Pd2, and Pdn for three different receive devices.

When forward link signaling occurs, the synchronization pulse 420 may include a warm-up period 422, a forward link period 424, and a listening period 426. The listening period 426 may include a handover period 427 and a beginning reverse link period 428. During the synchronization pulse 420, the transmitter may send out a forward link message during the forward link period 400 (indicated by the "hatched" section) and waits for a reply from a receiver during the listening period 426. In FIG. 15B, no receivers reply, which is indicated by the "white" sections during the listening period 426.

FIG. 15C is similar to FIG. 15B except that a receiver replies during the beginning reverse link period 428 and the reverse link period 430, as indicated by the "cross-hatched" sections. In FIG. 15, during the synchronization pulse 420, the transmitter sends out a forward link message during the forward link period 400 and waits for a reply from a receiver during the listening period 426. Any receivers that are going to reply begin their reply before the end of the handover period 427, during the beginning reverse link period 428, and possibly during the reverse link period 430.

As a non-limiting example, Table 2 shows some possible messages that may be sent by the transmitter and the receiver.

TABLE 2

| TX Command | TX message | RX Reply | RX message |
|---|---|---|---|
| Null | | | |
| NDQ (New Device Query) | | NDR (New Device Response) | DD TT PP rr cc |
| DQ (Device Query) | DD | DS (Device Status) | DD TT PP cc |
| ACK (Acknowledge a device XX from previous DS) | | | |
| SA (Slot Assignment) | DD NN MM cc | | |
| RES (Reset all power slot assignments) | | | |

Where:
Null = no transmit command;
DD = Device number;
TT = Device Type;
PP = Power requested;
rr = a random number;
cc = a checksum;
NN = start of time slot; and
MM = end of time slot In explaining table 1, the null command means that no messaging is sent by the transmitter during the forward link period 424. In line 2, a new device query (NDQ) is sent by the transmitter. If a receive device responds, it responds with a new device response (NDR) along with a device number (which should be zero for a new device, until the device number is assigned by the transmitter), a power request, a random number, and a checksum of all the data bits in the receive reply.

In line 3, a new device query (DQ) is sent by the transmitter along with a device number. The receive device that was addressed by the DQ replies with a device status (DS), along with the device number, the device type, the amount of power requested, and a checksum of all the data bits in the receive reply.

In line 4, the transmitter sends out an acknowledge (ACK) to the receiver that replied to the previous DQ. No receivers respond to an ACK In line 5, the transmitter sends out a slot assignment (SA) along with a device number, a start time within the power period 450', an end time within the power period 450', and a checksum of all the data bits in the receive reply. No receivers respond to an SA.

In line 6, the transmitter sends out a reset (RES) indicating that all receivers should stop using their allocated time slots. No receivers respond to an RES.

Of course, those of ordinary skill in the art will recognize that the commands and responses are exemplary and various embodiments contemplated within the scope of the present invention may use variations of these commands and responses, and additional commands and responses may be devised within the scope of the present invention.

To further illustrate how communication occurs, five different scenarios will be discussed. In the first scenario, initially no receive devices are within the coupling-mode region of the transmitter and one receive device enters the coupling-mode region. When no device are present in the coupling-mode region the transmitter will remain in the low power state as illustrated in FIG. 15A and repeat the synchronization pulse 420 every recurring period 410. The synchronization pulse 420 will include a NDQ during the forward link period 424 and the transmitter will listen for a reply during the listening period 426. If no reply is received, the transmitter shuts down until time for the synchronization pulse 420 of the next recurring period 410.

When a new receive device is introduced to the coupling-mode region, the receive device is initially on and listening for a synchronization pulse 420. The new receive device may use the synchronization pulse 420 for power but should go into a cloaked or non-power reception mode (referred to herein as "getting off the bus") during the power period 450'. In addition, the new receive device listens for transmit commands and ignores all transmit commands except an NDQ. When a new receive device receive an NDQ, it remains on during the handover period 427, the beginning reverse link period 428, and possibly the reverse link period 430. After the forward link period 424 and before the end of the handover period 427, the receive device responds with a NDR, a device ID of zero (a new device ID will be assigned by the transmitter), a power amount request, a random number and a checksum. The new receive device then gets off the bus during the power period 450'.

If the transmitter receives the NDR correctly, it responds on the next synchronization pulse 420 with a slot assignment (SA) for the new receive device. The SA includes a device ID for the new receive device, a start time, an end time, and a checksum. The start time and end time for this SA will be zero indicating that the new receive device should not get on the bus for any time period during the power period 450'. The new receive device will receive a subsequent SA with actual start times and end times assigning a specific power segment Pdn when it can get on the bus. If the new receive device does not receive a proper checksum, in remains in new device mode and responds again to an NDQ.

In the second scenario, no receive devices are within the coupling-mode region of the transmitter and more than one receive device enters the coupling-mode region. In this mode, when two new receive devices are introduced to the coupling-mode region they are initially on the bus all the time. The new receive devices may use the synchronization pulse 420 for power but should get off the bus during the power period 450' once a synchronization pulse 420 has been received. In addition, the new receive devices listen for transmit commands and ignore all transmit commands except an NDQ. When the new receive device receive an NDQ, they remain on during the handover period 427, the beginning reverse link period 428, and possibly the reverse link period 430. After the forward link period 424 and before the end of the handover period 427, the receive devices responds with a NDR, a device ID of zero (a new device ID will be assigned by the transmitter), a power amount request, a random number and a checksum.

However, since two or more receive devices are responding at the same time, and likely have different random numbers and checksums, the message received by the transmitter will be garbled, and the checksum in the transmitter will not be accurate. As a result, the transmitter will not send out a SA on the subsequent synchronization pulse 420.

When an immediate SA is not forthcoming after an NDR, each of the receive devices waits a random number of subsequent NDQs before responding with an NDR. For example, two devices both respond to the first NDQ so no subsequent SA happens. Device 1 decides to wait four NDQs before responding to another NDQ. Device 2 decides to wait two NDQs before responding to another NDQ. As a result, on the next NDQ sent out by the transmitter, neither device responds with an NDR. On the next NDQ sent out by the transmitter, only device 2 responds with an NDR, the transmitter successfully receives the NDR and sends out an SA for device 2. On the next NDQ, device 2 does not respond because it is no longer a new device and device 1 does not respond because its random waiting period has not elapsed. On the next NDQ sent out by the transmitter, only device 1 responds with an NDR, the transmitter successfully receives the NDR and sends out an SA for device 1.

In the third scenario, at least one receive device is in the coupling-mode region and a new receive device enters the coupling-mode region. In this mode, the new receive devices is introduced to the coupling-mode region and is initially on the bus all the time. The new receive devices may use the synchronization pulse 420 for power but should get off the bus during the power period 450' once a synchronization pulse 420 has been received. In addition, the new receive devices listen for transmit commands and ignore all transmit commands except an NDQ. Periodically, the transmitter will issue an NDQ to see if any new devices have entered the coupling-mode region. The new device will then reply with an NDR. On the subsequent synchronization pulse 420, the transmitter will issue an SA for the new device with no power slots assigned. The transmitter then recalculates power allocation for all the devices in the coupling-mode region and generates new SAs for each device so there are no overlapping power segments Pdn. After each device receives its new SA, it begins getting on the bus only during its new Pdn.

In the fourth scenario, normal power delivery operation continues with no receive device entering or leaving the coupling-mode region. During this scenario, the transmitter will periodically ping each device with a device query (DQ). The queried device responds with a device status (DS). If the DS indicates a different power request, the transmitter may reallocate power allocation to each of the devices in the coupling-mode region. The transmitter will also periodically issues an NDQ as was explained above for the third scenario.

In the fifth scenario, a device is removed from the coupling-mode region. This "removed" state may be that the device is physically removed from the coupling-mode region, the device is shut off, or the device cloaks itself, perhaps because it does not need any more power. As stated earlier, the transmitter periodically sends out a DQ for all the devices in the coupling-mode region. If two consecutive DQs to a specific device do not return a valid DS, the transmitter removes the device from its list of allocated devices and reallocates the power period 450' to the remaining devices. The transmitter will also assign the missing device a power allocation of zero time in case it is still receiving by is unable to transmit. If a device was erroneously removed from the power allocation, it may regain power allocation by responding to and NDQ with a proper NDR.

Table 3 illustrates a non-limiting sequence of commands and replies to illustrate how the communication protocol operates.

communication channel 119 (e.g., Bluetooth, zigbee, cellular, etc) as is shown in FIG. 2. With a separate communication channel, the recurring period need not include any communication periods and the entire time may be devoted to the power period 450'. The transmitter may still allocate time slots to each receive device (communicated over the separate communication channel) and each receive device only gets on the bus for its allocated power segment Pdn.

The time-multiplexed power allocations described above may be the most-efficient method for supplying power to multiple receive devices within a transmitter's coupling-mode region. However, other power allocation scenarios may be employed with other embodiments of the present invention.

Figure 16A:
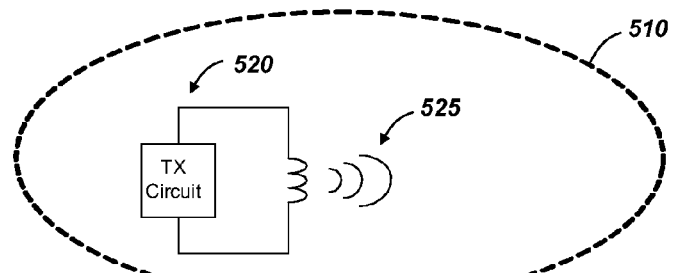
FIGS. 16A-16D are simplified block diagrams illustrating a beacon power mode for transmitting power between a transmitter and a receiver.

FIGS. 16A-16D are simplified block diagrams illustrating a beacon power mode for transmitting power between a transmitter and a one or more receivers. FIG. 16A illustrates a transmitter 520 having a low power "beacon" signal 525 when there are no receive devices in the beacon coupling-mode region 5 10. The beacon signal 525 may be, as a non-limiting example, such as in the range of ~10 to ~20 mW RF. This signal may be adequate to provide initial power to a device to be charged when it is placed in the coupling-mode region.

TABLE 3

| Command | Description | Reply | Description | Comments |
| --- | --- | --- | --- | --- |
| DQ1 | Query Device 1 | DS 1 1 FF cc | Device 1 is type 1, wants max power | Cellphone with low battery |
| DQ2 | Query Device 2 | DS 2 1 84 cc | Device 2 is type 3, wants to reduce power time slot | PDA with almost charged battery |
| SA 2 84 FF | Slot assign device 2 | | | Reduce device 2's power slot (reduce first, then increase) |
| SA 1 00 83 | Slot assign device 1 | | | Increase device 1's power slot |
| NDQ | New device query | NDR 00 04 FF rr cc | New device found | Mouse with a low battery, max power |
| SA 3 00 00 | Slot assign device 3 | | | Immediate reply after NDQ means it is for new device. Device ID is 3. Initial power slot is 0. |
| SA 1 00 40 | Slot assign device 1 | | | Device 1 reassigned to ¼power. |
| SA2 41 80 | Slot assign device 2 | | | Device 2 reassigned to ¼power. |
| SA 3 81 FF | Slot assign device 2 | | | Device 3 reassigned to ½power. |
| NDQ | New device query | | | No reply so no new device found. |
| null | | | | |
| DQ1 | | | | |
| DQ2 | | | | |
| DQ3 | | | | |
| NDQ | | | | |

Note that the first slot assignment for the new device allocates no time slot. Each existing device is allocated a new non-overlapping time slot, then the new device is finally allocated a time slot for receiving power.

In an exemplary embodiment, a wireless charging devices may display a visible signal, such as, for example, a light to the user indicating that it has successfully entered the charging region and registered itself to the local transmitter. This will give the user positive feedback that a device is indeed prepared to charge.

Figure 16B:
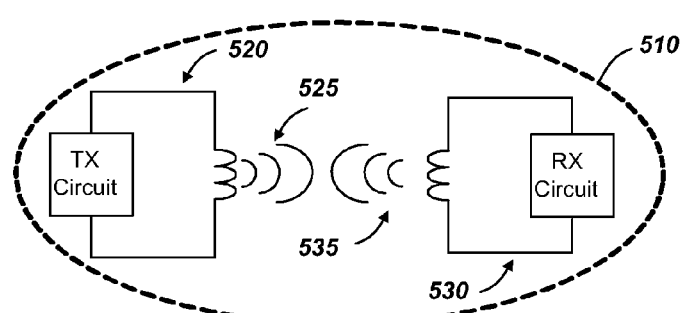

In other exemplary embodiments of the present invention, the receiver and transmitter may communicate on a separate FIG. 16B illustrates a receive device 530 placed within the beacon coupling-mode region 510 of the transmitter 520 transmitting the beacon signal 525. If the receive device 530 is on and develops a coupling with the transmitter it will generate a reverse link coupling 535, which is really just the receiver accepting power from the beacon signal 525. This additional power, may be sensed by the load sensing circuit 216 (FIG. 12) of the transmitter. As a result, the transmitter may go into a high power mode.

Figure 16C:
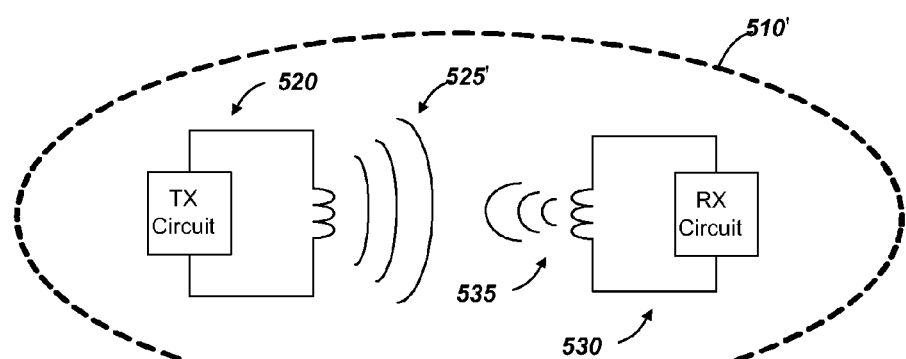

FIG. 16C illustrates the transmitter 520 generating a high power signal 525' resulting in a high power coupling-mode region 510'. As long as the receive device 530 is accepting power and, as a result, generating the reverse link coupling 535, the transmitter will remain in the high power state. While only one receive device 530 is illustrated, multiple receive devices 530 may be present in the coupling-mode region 510. If there are multiple receive device 530 they will share the amount of power transmitted by the transmitter based on how well each receive device 530 is coupled. For example, the coupling efficiency may be different for each receive device 530 depending on where the device is placed within the coupling-mode region 510 as was explained above with reference to FIGS. 8 and 9.

Figure 16D:
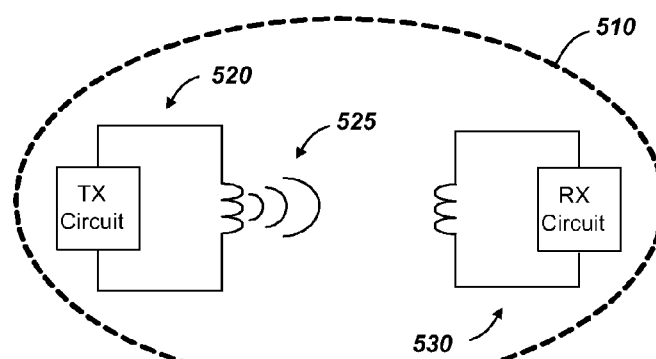

FIG. 16D illustrates the transmitter 520 generating the beacon signal 525 even when a receive device 530 is in the beacon coupling-mode region 510. This state may occur when the receive device 530 is shut off, or the device cloaks itself, perhaps because it does not need any more power.

As with the time-multiplexing mode, the receiver and transmitter may communicate on a separate communication channel (e.g., Bluetooth, zigbee, etc). With a separate communication channel, the transmitter may determine when to switch between beacon mode and high power mode, or create multiple power levels, based on the number of receive devices in the coupling-mode region 510 and their respective power requirements.

Exemplary embodiments of the invention include enhancing the coupling between a relatively large transmit antenna and a small receive antenna in the near field power transfer between two antennas through introduction of additional antennas into the system of coupled antennas that will act as repeaters and will enhance the flow of power from the transmitting antenna toward the receiving antenna.

In an exemplary embodiment, one or more extra antennas are used that couple to the transmit antenna and receive antenna in the system. These extra antennas comprise repeater antennas, such as active or passive antennas. A passive antenna may include simply the antenna loop and a capacitive element for tuning a resonant frequency of the antenna. An active element may include, in addition to the antenna loop and one or more tuning capacitors, an amplifier for increasing the strength of a repeated near field radiation.

The combination of the transmit antenna and the repeater antennas in the power transfer system may be optimized such that coupling of power to very small receive antennas is enhanced based on factors such as termination loads, tuning components, resonant frequencies, and placement of the repeater antennas relative to the transmit antenna.

A single transmit antenna exhibits a finite near field coupling mode region. Accordingly, a user of a device charging through a receiver in the transmit antenna's near field coupling mode region may require a considerable user access space that would be prohibitive or at least inconvenient. Furthermore, the coupling mode region may diminish quickly as a receive antenna moves away from the transmit antenna.

A repeater antenna may refocus and reshape a coupling mode region from a transmit antenna to create a second coupling mode region around the repeater antenna, which may be better suited for coupling energy to a receive antenna.

Figure 17A:
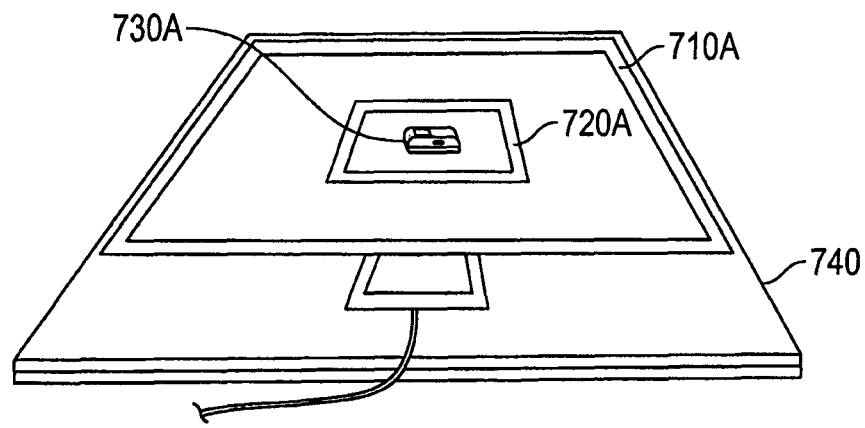
FIG. 17A illustrates a large transmit antenna with a smaller repeater antenna disposed coplanar with, and coaxial with, the transmit antenna.

FIG. 17A illustrates a large transmit antenna 710A with a smaller repeater antenna 720A disposed coplanar with, and within a perimeter of, the transmit antenna 710A. The transmit antenna 710A and repeater antenna 720A are both formed on a table 740. A device including a receive antenna 730A is placed within the perimeter of the repeater antenna 720A. With very large antennas, there may be areas of the coupling mode region that are relatively week near the center of the transmit antenna 710A. Presence of this weak region may be particularly noticeable when attempting to couple to a very small receive antenna 730A. The repeater antenna 720A placed coplanar with the transmit antenna 710A, but with a smaller size, may be able to refocus the coupling mode region generated by the transmit antenna 710A into a smaller and stronger repeated coupling mode region around the repeater antenna 720A. As a result, a relatively strong repeated near field radiation is available for the receive antenna 730A.

Figure 17B:
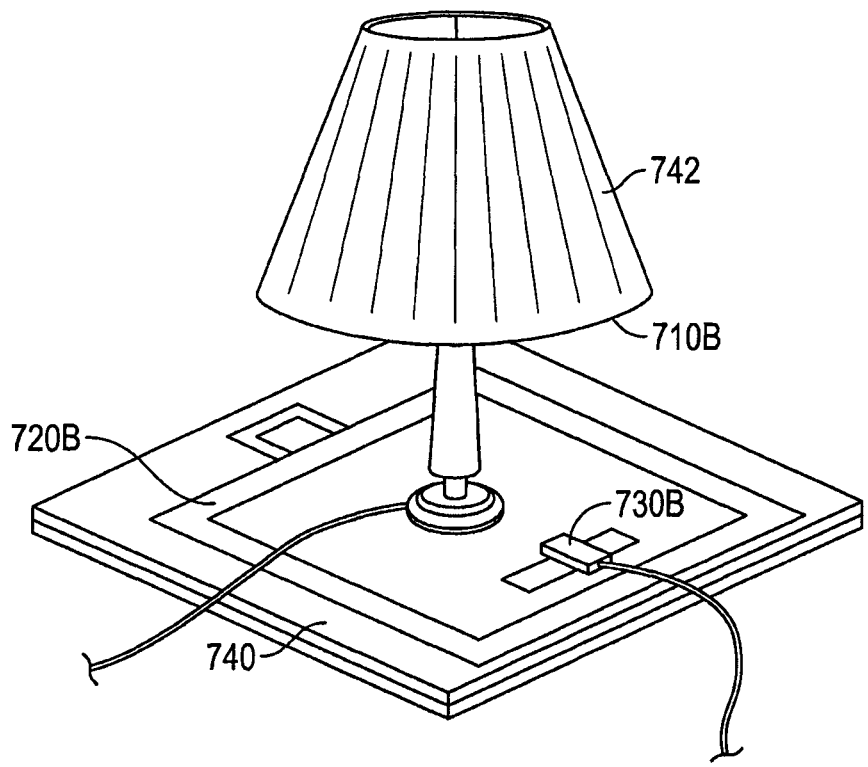
FIG. 17B illustrates a transmit antenna with a larger repeater antenna with a coaxial placement relative to the transmit antenna.

FIG. 17B illustrates a transmit antenna 710B with a larger repeater antenna 720B with a coaxial placement relative to the transmit antenna 710B. A device including a receive antenna 730B is placed within the perimeter of the repeater antenna 720B. The transmit antenna 710B is formed around the lower edge circumference of a lamp shade 742, while the repeater antenna 720B is disposed on a table 740. Recall that with coaxial placements, the near field radiation may diminish relatively quickly relative to distance away from the plane of an antenna. As a result, the small receive antenna 730B placed in a coaxial placement relative to the transmit antenna 710B may be in a weak coupling mode region. However, the large repeater antenna 720B placed coaxially with the transmit antenna 710B may be able to reshape the coupled mode region of the transmit antenna 710B to another coupled mode region in a different place around the repeater antenna 720B. As a result, a relatively strong repeated near field radiation is available for the receive antenna 730B placed coplanar with the repeater antenna 720B.

Figure 18A:
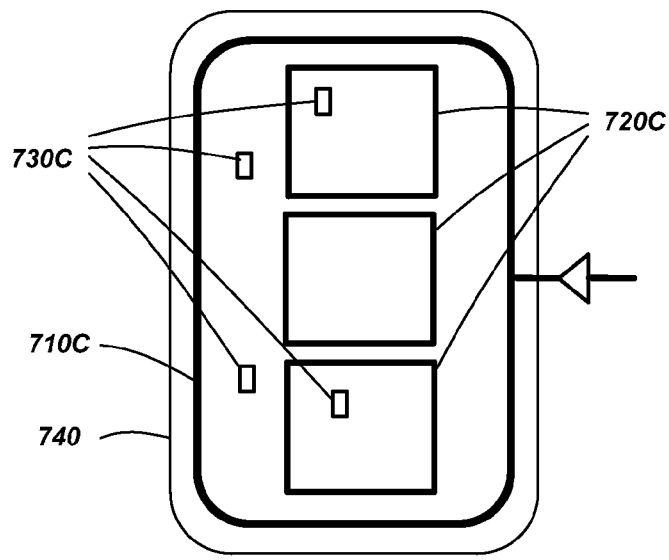
FIG. 18A illustrates a large transmit antenna with a three different smaller repeater antennas disposed coplanar with, and within a perimeter of, the transmit antenna.

FIG. 18A illustrates a large transmit antenna 710C with three smaller repeater antennas 720C disposed coplanar with, and within a perimeter of, the transmit antenna 710C. The transmit antenna 710C and repeater antennas 720C are formed on a table 740. Various devices including receive antennas 730C are placed at various locations within the transmit antenna 710C and repeater antennas 720C. As with the embodiment illustrated in FIG. 17A, the embodiment of FIG. 18A may be able to refocus the coupling mode region generated by the transmit antenna 710C into smaller and stronger repeated coupling mode regions around each of the repeater antennas 720C. As a result, a relatively strong repeated near field radiation is available for the receive antennas 730C. Some of the receive antennas are placed outside of any repeater antennas 720C. Recall that the coupled mode region may extend somewhat outside the perimeter of an antenna. Therefore, receive antennas 730C may be able to receive power from the near field radiation of the transmit antenna 710C as well as any nearby repeater antennas 720C. As a result, receive antennas placed outside of any repeater antennas 720C, may be still be able to receive power from the near field radiation of the transmit antenna 710C as well as any nearby repeater antennas 720C.

Figure 18B:
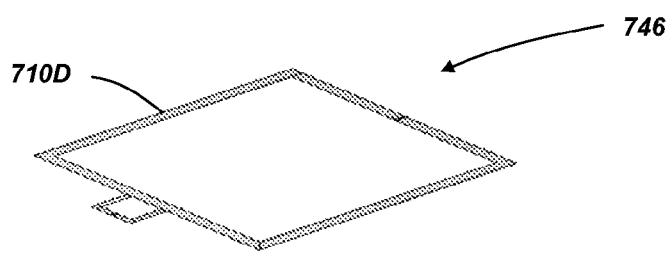
FIG. 18B illustrates a large transmit antenna with smaller repeater antennas with offset coaxial placements and offset coplanar placements relative to the transmit antenna.
Figure 18B:
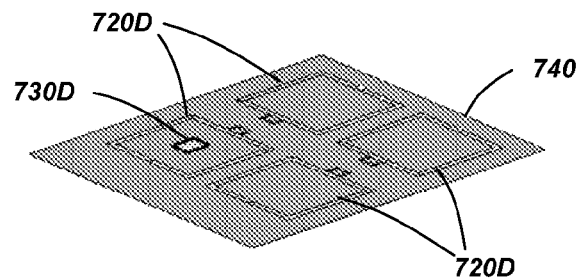

FIG. 18B illustrates a large transmit antenna 710D with smaller repeater antennas 720D with offset coaxial placements and offset coplanar placements relative to the transmit antenna 710D. A device including a receive antenna 730D is placed within the perimeter of one of the repeater antennas 720D. As a non-limiting example, the transmit antenna 710D may be disposed on a ceiling 746, while the repeater antennas 720D may be disposed on a table 740. As with the embodiment of FIG. 17B, the repeater antennas 720D in an offset coaxial placement may be able to reshape and enhance the near field radiation from the transmitter antenna 710D to repeated near field radiation around the repeater antennas 720D. As a result, a relatively strong repeated near field radiation is available for the receive antenna 730D placed coplanar with the repeater antennas 720D.

While the various transmit antennas and repeater antennas have been shown in general on surfaces, these antennas may also be disposed under surfaces (e.g., under a table, under a floor, behind a wall, or behind a ceiling), or within surfaces (e.g., a table top, a wall, a floor, or a ceiling).

Figure 19:
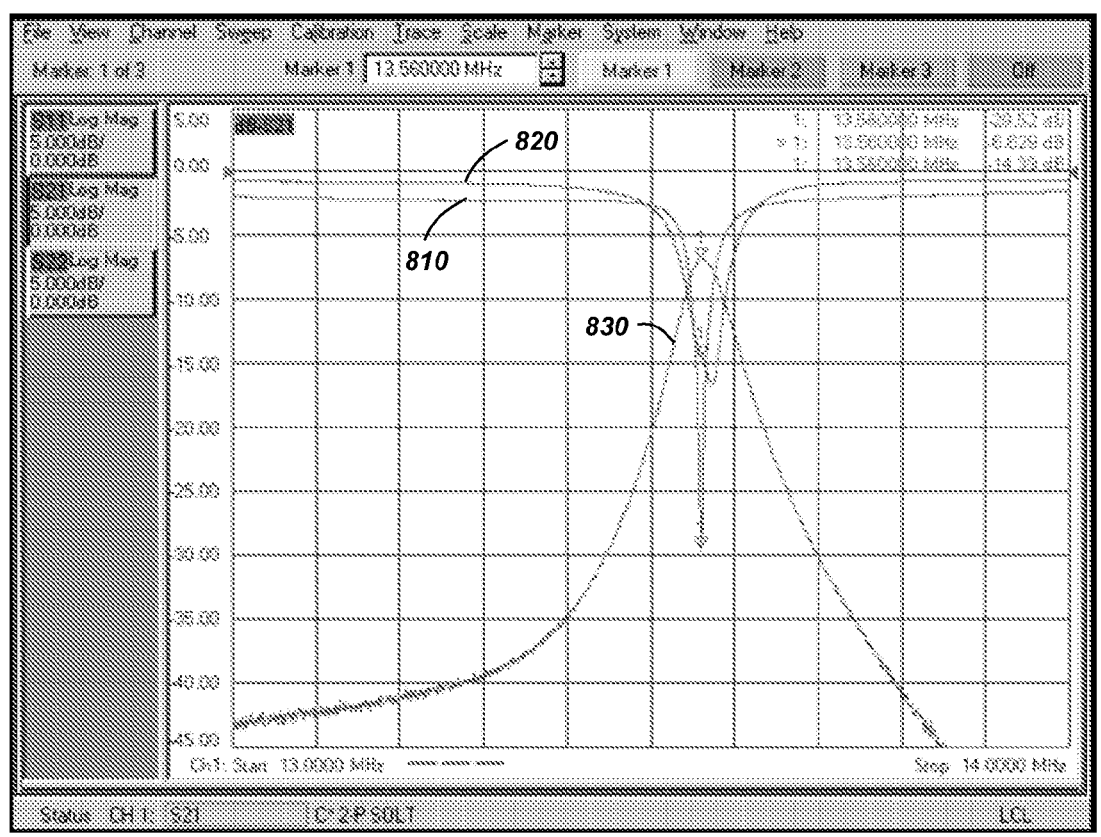
FIG. 19 shows simulation results indicating coupling strength between a transmit antenna, a repeater antenna and a receive antenna.

FIG. 19 shows simulation results indicating coupling strength between a transmit antenna, a repeater antenna and a receive antenna. The transmit antenna, the repeater antenna, and the receive antenna are tuned to have a resonant frequency of about 13.56 MHz.

Curve 810 illustrates a measure for the amount of power transmitted from the transmit antenna out of the total power fed to the transmit antenna at various frequencies. Similarly, curve 820 illustrates a measure for the amount of power received by the receive antenna through the repeater antenna out of the total power available in the vicinity of its terminals at various frequencies. Finally, Curve 830 illustrates the amount of power actually coupled between the transmit antenna, through the repeater antenna and into the receive antenna at various frequencies.

At the peak of curve 830, corresponding to about 13.56 MHz, it can be seen that a large amount of the power sent from the transmitter is available at the receiver, indicating a high degree of coupling between the combination of the transmit antenna, the repeater antenna and the receive antenna.

Figure 20A:
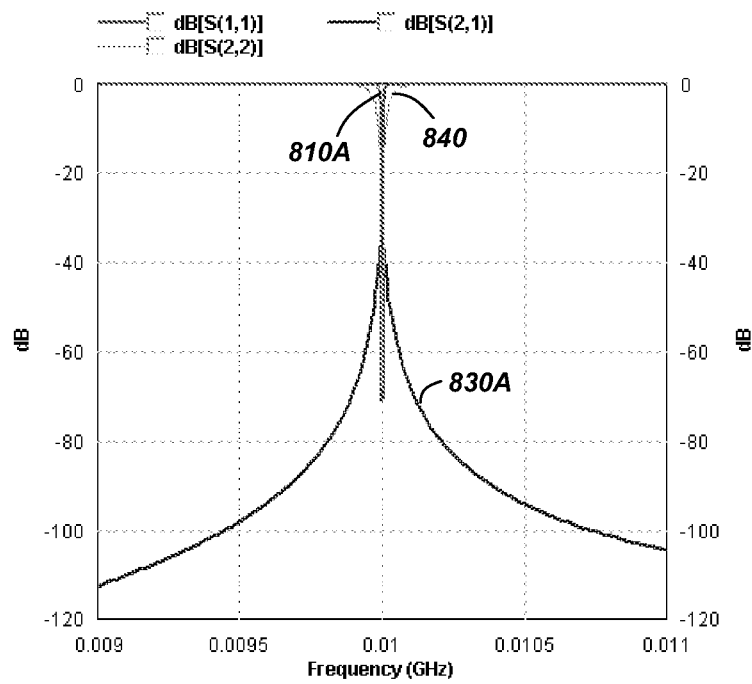
FIG. 20A shows simulation results indicating coupling strength between a transmit antenna and receive antenna with no repeater antennas.

FIG. 20A show simulation results indicating coupling strength between a transmit antenna and receive antenna disposed in a coaxial placement relative to the transmit antenna with no repeater antennas. The transmit antenna and the receive antenna are tuned to have a resonant frequency of about 10 MHz. The transmit antenna in this simulation is about 1.3 meters on a side and the receive antenna is a multi-loop antenna at about 30 mm on a side. The receive antenna is placed at about 2 meters away from the plane of the transmit antenna. Curve 810A illustrates a measure for the amount of power transmitted from the transmit antenna out of the total power fed to its terminals at various frequencies. Similarly, curve 840 illustrates a measure of the amount of power received by the receive antenna out of the total power available in the vicinity of its terminals at various frequencies. Finally, Curve 830A illustrates the amount of power actually coupled between the transmit antenna and the receive antenna at various frequencies.

Figure 20B:
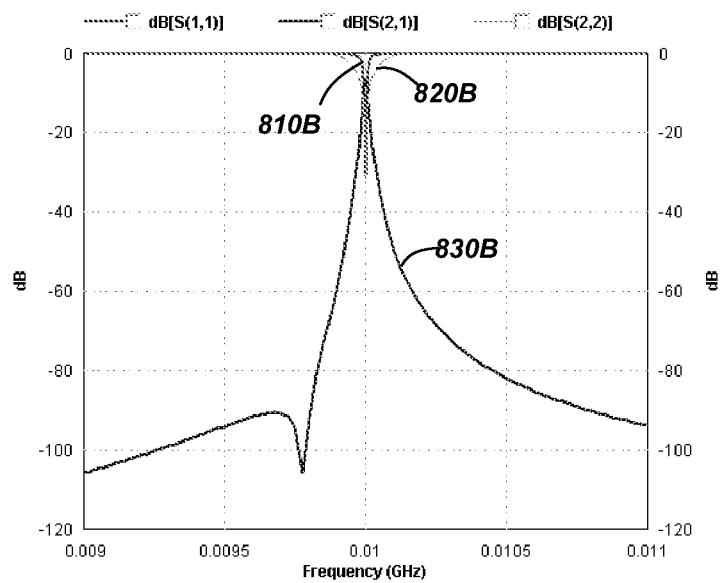
FIG. 20B shows simulation results indicating coupling strength between a transmit antenna and receive antenna with a repeater antenna.

FIG. 20B show simulation results indicating coupling strength between the transmit and receive antennas of FIG. 20A when a repeater antenna is included in the system. The transmit antenna and receive antenna are the same size and placement as in FIG. 20A. The repeater antenna is about 28 cm on a side and placed coplanar with the receive antenna (i.e., about 0.1 meters away from the plane of the transmit antenna). In FIG. 20B, Curve 810B illustrates a measure of the amount of power transmitted from the transmit antenna out of the total power fed to its terminals at various frequencies. Curve 820B illustrates the amount of power received by the receive antenna through the repeater antenna out of the total power available in the vicinity of its terminals at various frequencies. Finally, Curve 830B illustrates the amount of power actually coupled between the transmit antenna, through the repeater antenna and into the receive antenna at various frequencies.

When comparing the coupled power (830A and 830B) from FIGS. 20A and 20B it can be seen that without a repeater antenna the coupled power 830A peaks at about −36 dB. Whereas, with a repeater antenna the coupled power 830B peaks at about −5 dB. Thus, near the resonant frequency, there is a significant increase in the amount of power available to the receive antenna due to the inclusion of a repeater antenna.

Figure 21:
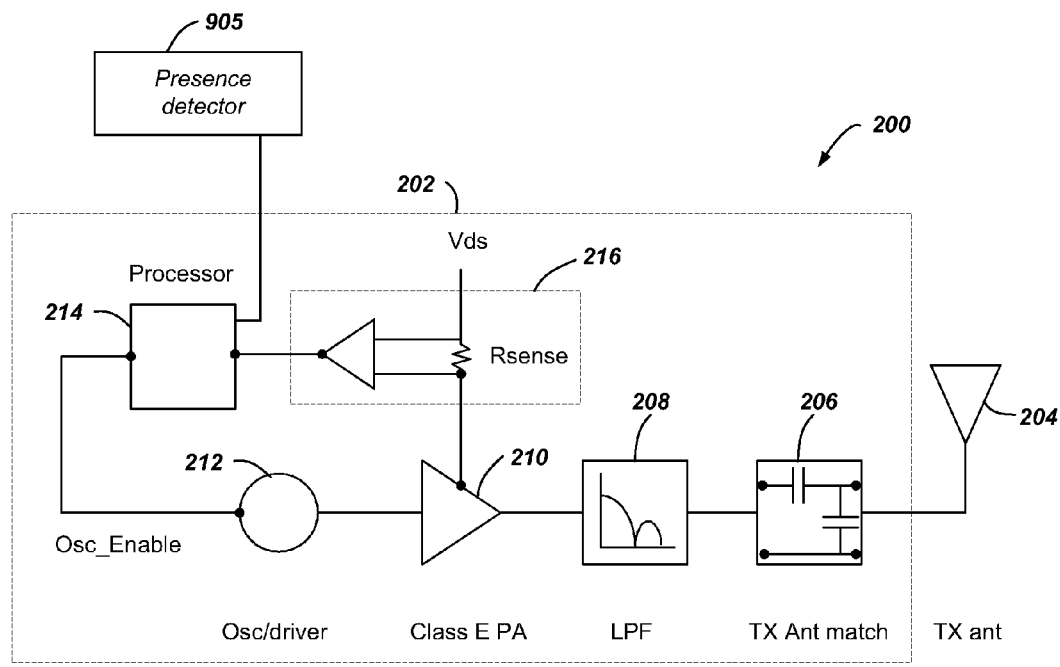
FIG. 21 is a simplified block diagram of a transmitter including a presence detector.

Exemplary embodiments of the invention include low cost unobtrusive ways to properly manage how the transmitter radiates to single and multiple devices and device types in order to optimize the efficiency by which the transmitter conveys charging power to the individual devices FIG. 21 is a simplified block diagram of a transmitter 200 including a presence detector 905. The transmitter is similar to that of FIG. 10 and, therefore, does not need to be explained again. However, in FIG. 21 the transmitter 200 includes a presence detector 905 connected to the processor 214 (also referred to as a controller herein). The processor 214 can adjust an amount of power delivered by the amplifier 210 in response to signals form the presence detector 905.

As a non-limiting example, the presence detector may be a motion detector utilized to sense the initial presence of a device to be charged that is inserted into the coverage area of the transmitter. After detection, the transmitter is turned on and the RF power received by the device is used to toggle a switch on the Rx device in a pre-determined manner, which in turn results in changes to the driving point impedance of the transmitter.

As another non-limiting example, the presence detector may be a detector capable of detecting a human, for example, by infrared detection, motion detection, or other suitable means. In some embodiments, there may be regulations limiting the amount of power that a transmit antenna may transmit at a specific frequency. In some cases, these regulations are meant to protect humans from electromagnetic radiation. However, there may be environments where transmit antennas are placed in areas not occupied by humans, or occupied infrequently by humans, such as, for example, garages, factory floors, shops, and the like. If these environments are free from humans, it may be permissible to increase the power output of the transmit antennas above the normal power restrictions regulations. In other words, the controller 214 may adjust the power output of the transmit antenna 204 to a regulatory level or lower in response to human presence and adjust the power output of the transmit antenna 204 to a level above the regulatory level when a human is outside a regulatory distance from the electromagnetic field of the transmit antenna 204.

In many of the examples below, only one guest device is shown being charged. In practice, a multiplicity of the devices can be charged from a hot spot generated by each host.

In exemplary embodiments, a method by which the Tx circuit does not remain on indefinitely may be used. In this case, the Tx circuit may be programmed to shut off after a user-determined amount of time. This feature prevents the Tx circuit, notably the power amplifier, from running long after the wireless devices in its perimeter are fully charged. This event may be due to the failure of the circuit to detect the signal sent from either the repeater or the Rx coil that a device is fully charged. To prevent the Tx circuit from automatically shutting down if another device is placed in its perimeter, the Tx circuit automatic shut off feature may be activated only after a set period of no motion detected in its perimeter. The user may be able to determine the inactivity time interval, and change it as desired. As a non-limiting example, the time interval may be longer than that needed to fully charge a specific type of wireless device under the assumption of the device being initially fully discharged.

Exemplary embodiments of the invention include using home appliances and electronic equipment, office and laboratory equipment, and factory equipment and machines as the charging stations or "hosts," housing totally, or partially, the transmit antenna and other circuitry necessary for wireless transfer of power to other often smaller devices, equipment, or machines referred to as "guests." As non-limiting examples, these charging stations or hosts could be lamps, microwave and convection ovens, television and radio sets, DVD, cassette recording and other audio and video equipment, laptop and desktop computers, scanners, fax machines and printers, milling machines, lathes, and so on. The charging system, which can partially be embedded in the aforementioned examples, may either be a retrofit to existing equipment, or made as part of their initial design and manufacturing.

Electrically small antennas have low efficiency, often no more than a few percent as explained by the theory of small antennas. The smaller the electric size of an antenna, the lower is its efficiency. The wireless power transfer can become a viable technique replacing wired connection to the electric grid in industrial, commercial, and household applications if power can be sent over meaningful distances to the devices that are in the receiving end of such power transfer system. While this distance is application dependent, a few tens of a centimeter to a few meters can be deemed a suitable range for most applications. Generally, this range reduces the effective frequency for the electric power in the interval between 5 MHz to 100 MHz.

Exemplary embodiments of the invention include converting a variety of the equipment around the house, in the office, and in factory to hosts that can transfer electric power wirelessly to guest devices either to charge their rechargeable batteries or to directly feed them. The advantage of this concept is to provide several hot spots in the environment that the hosts are located for wireless transfer of power to guest devices and equipment without having to establish independent infrastructure for wireless transmission of electric power. It has several advantages over a larger host antenna that is dedicated to transmission of electric power to longer distances. Such a large antenna is often harder to be blended into the decor of the environment and may not be esthetically acceptable. In addition, larger antennas may generate larger electromagnetic (EM) fields and it may be harder to comply with safety issues.

In exemplary embodiments, at least two power supply issues are addressed: 1. Battery life for portable battery operated devices is limited and charging is inconvenient or difficult in many cases. This exemplary embodiment system allows for battery-operated devices to be charged while on the user's person while sitting at the desktop. 2. Cords for the desktop. Desktops are cluttered with wires and connectors that are required to power and receive signals from other devices. The disclosed exemplary embodiments allow the removal of these wires in conjunction with wireless communication techniques.

In an exemplary embodiment, a physically large antenna is embedded around the display of a desktop LCD monitor/Laptop/Desktop lamp or other device that is physically large and has a power source and the associated electronics are embedded within the host device and draws its power from the host device. This primary antenna can then power the keyboard and mouse, which each have a receiving antenna embedded along with required electronics. Since the keyboard or a mouse pad can also fit a physically large antenna and near field magnetic resonant power transfer can be made dramatically more efficient with a repeater antenna the keyboard antenna can be used as a repeater. This repeater is then physically close to a user's wireless communication device, such as cell-phone, iPod, iphone Bluetooth headset etc. in their pocket or on their body. This arrangement will allow for high efficiency wireless power transfer and a highly usable system. This exemplary embodiment system can also allow peripheral devices communicate back to the source by loading and unloading the system in a pulse manner to communicate requirements, turn the power on or off. This exemplary embodiment system will increase efficiency by turning off the transmitters when not required. In another exemplary embodiment, receiving devices could also be enabled to transmit low levels of power to communicate back to the transmitter if it is turned off.

The repeater improves efficiency and therefore decreases charge times, decreases energy losses and reduces the required magnetic field strength needed to implement the system. This multi-step approach also enables charging of peripheral devices such as the keyboard, mouse, headsets, webcams, etc that may be on the users desk. The elimination of wires and removal of the need to change batteries of devices may make wireless peripherals dramatically more attractive to users.

In another exemplary embodiment, repeater assisted near-field wireless power transfer disclosed above is used to improve the low power transfer efficiency inherent in coupled systems whose antennas are electrically very small. Depending on the specific application, it may also be useful to take advantage of this concept to further enhance the efficiency of the wireless power transfer from the Tx hosts as described above to the guest users of the wireless power. The details of the integration of Tx antenna and the transmit circuitry, and also the repeater, Rx antenna, and the charging circuitry can vary from host to host, but the concept remains the same. For example, when the host is a home or office lamp, the transmitter may be equipped with a screw-in end (like a light bulb) and screwed into the bulb socket in the lamp.

Exemplary embodiment disclosed uses host equipments and extra antennas such as repeaters that couple to the Tx and Rx antenna in the system. These antennas repeaters could be fed with electric power or they could be terminated. The combination of the repeaters and the coupled antennas in the power transfer system can be optimized such that coupling of power to very small Rx antennas is enhanced. The termination load and tuning component in the repeaters could also be used to optimize the power transfers in a system.

Various exemplary topologies and circuits, which can be used in conjunction with the exemplary embodiments described above, are shown below in FIGS. 22-26.

Figure 22:
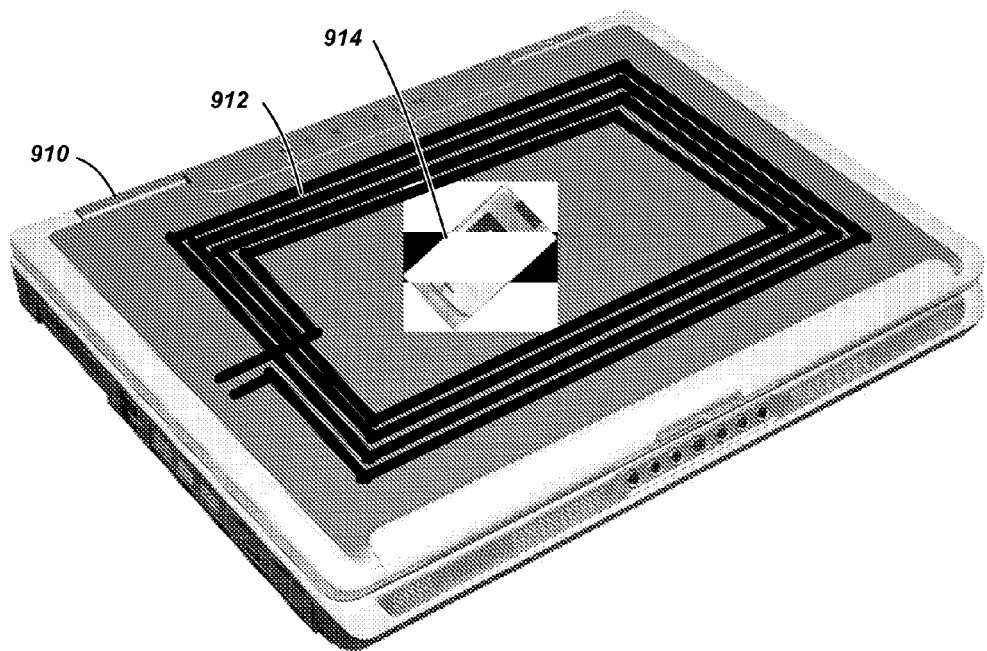
FIG. 22 illustrates an exemplary embodiment of a laptop which is equipped with a transmit antenna shaped as a coil.

FIG. 22 illustrates an exemplary embodiment of a laptop 910 which is equipped with a transmit antenna 912 shaped as a coil. The transmit antenna 912 is coupled with a small receive antenna integrated with a mobile handset 914. Power in the near-field is wirelessly coupled to the receive antenna charging the battery of the handset 914.

Figure 23:
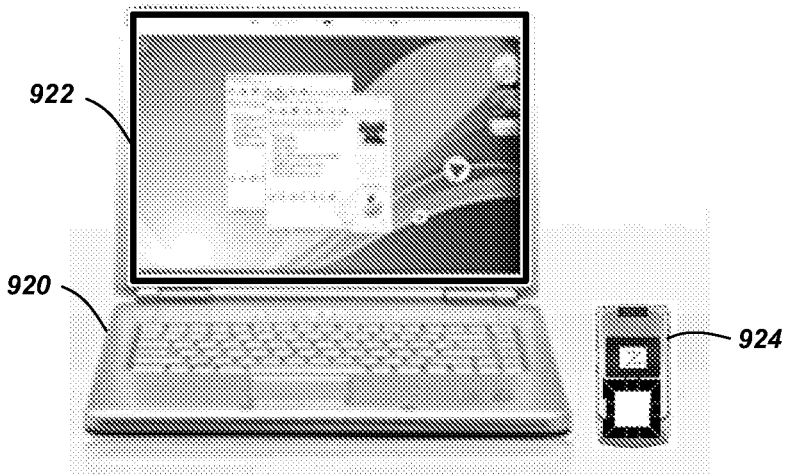
FIG. 23 illustrates another exemplary embodiment of a transmitter in a laptop when the laptop has the display open.

FIG. 23 illustrates another exemplary embodiment of a transmitter in a laptop 920 when the laptop has the display open. A transmit antenna 922 is shaped around the perimeter of the display in the laptop 920. The transmit antenna 922 is coupled with a small receive antenna integrated with a mobile handset 924. Power in the near-field is wirelessly coupled to the receive antenna charging the battery of the handset 924. Optionally, a repeater antenna (not shown) may be used to improve the coupling efficiency when the handset is laid randomly in the proximity of the laptop on the table.

Figure 24:
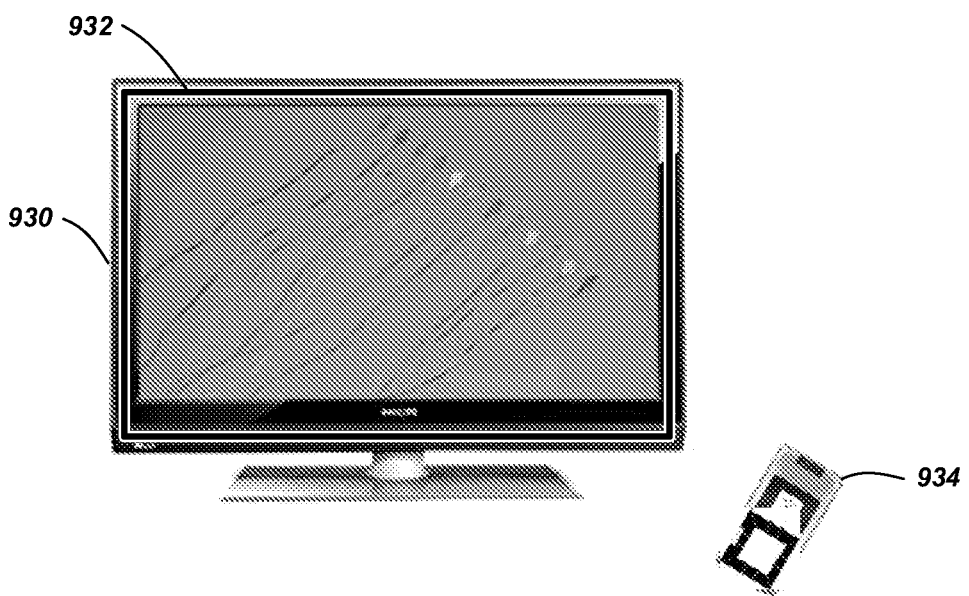
FIG. 24 illustrates an exemplary embodiment of a transmitter in a television set on a table or on the wall working as a host to charge a nearby handset guest.

FIG. 24 illustrates an exemplary embodiment of a transmitter antenna 932 in a television set 930 on a table or on the wall working as a host to charge a nearby handset guest 934.

Figure 25:
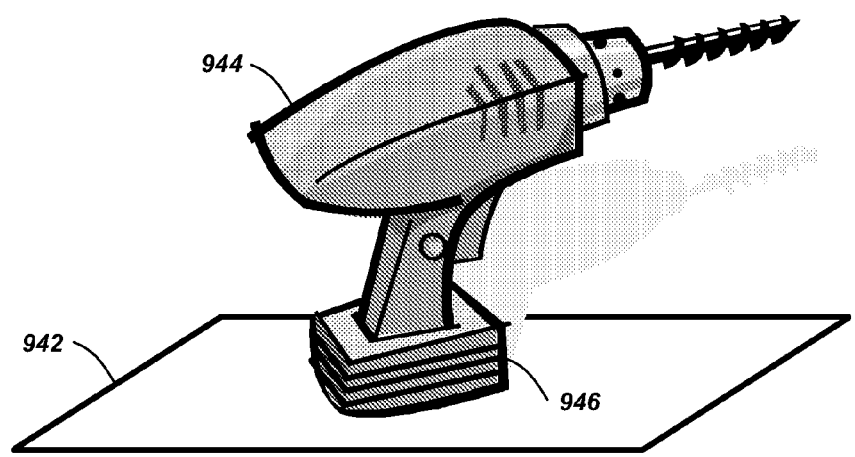
FIG. 25 illustrates an exemplary embodiment of a transmitter on a table working as a host to charge a nearby drill guest.

FIG. 25 illustrates an exemplary embodiment of a transmitter antenna 942 on a table working as a host to charge a nearby drill guest 944. The drill 944 includes a multi-turn receive antenna 946 wrapped around a battery of the drill 944.

Figure 26:
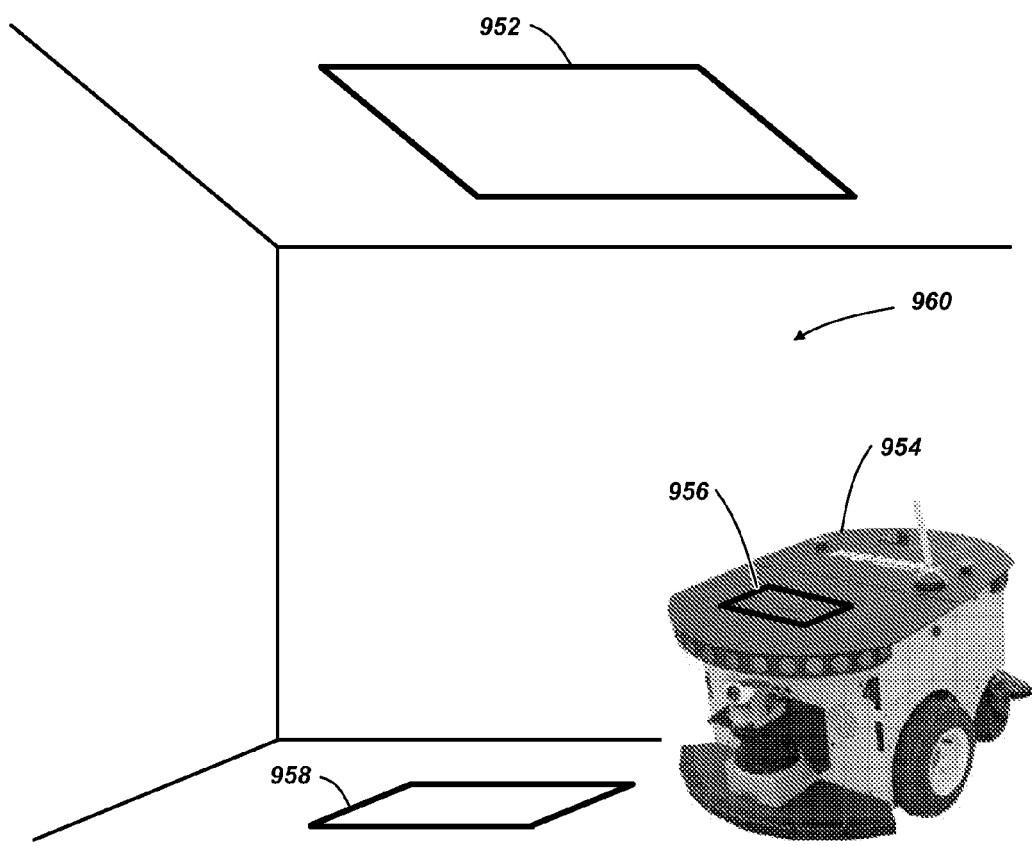
FIG. 26 illustrates an exemplary embodiment of a transmitter on a ceiling and a repeater on a floor for charging a nearby robot guest.

FIG. 26 illustrates an exemplary embodiment of a room 960 with a transmitter antenna 952 on a ceiling and a repeater antenna 958 on a floor for charging a nearby robot guest 954. The robot 954 includes a receive antenna 956. When charged, the robot in this embodiment is free to roam and returns to within the coupling-mode region of the transmit antenna, the repeater antenna, or both, to receive power and recharge its batteries.

It may be desirable to have small antennas for a variety of robots and autonomous vehicles used in the industry. One approach to compensate for the low efficiency of the small Rx antenna is to shorten the distance for power transfer. Exemplary embodiments may utilize at least two antennas, a Tx antenna reasonably sized to be integrated into a host equipment such as the examples mentioned above, and an Rx antenna small enough to be embedded into devices with small form factor such as a wireless or cordless handset, a PDA, an ipod, etc., or factory robots and autonomous vehicles that needs to be charged, or run directly on the wireless power. Use of several host equipment and creation of hot spots around them can shorten the range for wireless power transfer and compensate for the low efficiency of the smaller antenna involved, while at the same time make access to wireless power convenient throughout the homes, offices, and factories without having to deal with the problems associated with a single, larger Tx antenna that can cover larger areas.

Other exemplary embodiments of the disclosure include low power devices such as: eBooks, wireless digital photo frames, smoke alarms and remote controls. which can charge at a very low power level when left in a users home, office or any location that the device may be found. These devices can be charged for a long period of time with a low level of wireless power and always have sufficient power to operate. Thus, a wireless Digital Photo Frame may be enabled that hung on a wall without any wired power provided. In the exemplary embodiment of a smoke Alarms, these devices could be charged in the same way as above with no need for hard wired electrical power. In the exemplary embodiment of remote controls: As above these devices could be charged anywhere where the wireless power could penetrate at a low rate. Other low power devices found in the home, office, work environment, public areas, etc could use the same methodology.

Other exemplary embodiments of the disclosure include charging small capacity batteries used in devices that are not in constant use such as small lights used for reading, illuminating pictures, Bluetooth headsets for phones, computer keyboards and mice, residential fire alarms are just a few of many examples that might fall in this category. In this case, a remote loop antenna and transmitter can be used to transmit RF energy to a multiplicity of these devices provided they are within the coverage area of the Tx antenna. Small RFID tag-like devices are mounted on or within the devices to be charged contain a multi-turn loop antenna and IC electronics that receive, rectify, and charge the device's small battery.

The Tx antenna can be in many form factors that are consistent with the application. One example would be a home office where the Tx antenna is integrated around the perimeter of a desktop computer display. The Tx antenna/transmitting electronics can get power from that already available for display so another external power supply is not required. The devices to be charged could be the computer keyboard, mouse, reading lamp, electronic stapler or any other device implementing smaller capacity batteries. The direct RF coupling between the Tx and various Rx antennas/devices will be dependant on the size, frequency of operation, and relative spacing between the Tx and Rx antennas. Although the direct coupling between the Rx devices and Tx antenna can be low since Rx antenna may need to be electrically very small in order to fit in the small devices, and hence charging time is apt to be slow, it is realized that if the charging is to be done for extended periods of time, such as for example, over night or during off work hours and the batteries to be charged in the devices do not require high capacity (such as in that used for the mobile phone or laptop application), a slow charging rate may be tolerable. Therefore, the methodology suggested here is to have the Tx antenna/transmitter be active primarily during expected periods of down time and to apply this to devices with battery capacity that is small enough to tolerate the slower charging rates.

In another exemplary embodiment, a solar cell can transmit wireless power through the walls of a building and charge devices on the inside of the structure using wireless power. This may include using wireless power just to transmit through the wall of the building to wiring or from the solar cell all the way to the end device.

In another exemplary embodiment, wireless power is used for transportation applications such as wireless charging of user devices in an airplane or a car. In an exemplary embodiment, wireless power could be provided to the traveler's seat or to cover the entire plane and allow travelers to charge their consumer electronic devices while in the air. Automotive charging within a car charging antennas can be placed under the dash or in the seats of the vehicle to charge consumer electronic devices that users have on their person or place then in charging repositories within the car. This method would also allow users to place devices on the floor of passenger foot-wells to charge then or within a glove box to charge. These methods are also applicable to boats, trains, buses and all other forms of transportation.

In another exemplary embodiment wireless power can be utilized to transfer energy from a central or distributed energy stores to transducers, processors, displays and any devices requiring power on the user. These devices may be carried by the user or implanted within the user's body. Applications may include having an energy-harvesting device charging other devices or an energy storage device. An example is a heel mounted energy-harvesting device charging a phone in the user's pocket. The user may also be able to charge the wireless power storage device on their body or implanted within it by an external wireless charging station that may be located in their home, office or within any area that they may spend time.

In another exemplary embodiment, wireless power can be utilized for powering electric vehicles that require charging but the connection of electrical power is difficult, dangerous, and inconvenient. Using wireless power, these issues can be overcome. In an exemplary embodiment, a wireless power charger is installed under a vehicle parking spot and installed with a human detecting device the system will charge the car at low power while humans are present but when safe to do so the system will increase the level of power to increase the rate of charging. In an exemplary embodiment, the system may also optimize the charging profile based on conditions of the battery and the charging environment. While the vehicle is charging, it may in turn provide power to devices within the vehicle. In an exemplary embodiment, wireless power could be used within the vehicle to reduce the need for wiring to power lights, instruments and other power consuming devices. This solution can reduce the weight of the vehicle improving performance and efficiency.

In another exemplary embodiment, wireless power can be utilized for powering or charging commercial and residential robotic devices while they are working and at a higher level once the robot is optimally positioned with respect to the charging device. The system can regulate the power transmitted to the robotic devices based on robots required power, energy reserve, location of humans, etc.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for wirelessly transferring power to a receive antenna of a receiver device, comprising:
   a transmit antenna configured to generate an electromagnetic field to wirelessly transfer the power to the receive antenna at a resonant frequency within a coverage area of the transmit antenna;
   an amplifier configured to output electric power to the transmit antenna for generating the electromagnetic field;
   a presence detector configured to detect a presence of the receiver device within the coverage area in the absence of physical contact with the receiver device, of using the electromagnetic field, and of receiving data communication from the receiver device, and configured to generate a presence signal in response to the detection of the presence of the receiver device; and
   a controller operably coupled to the presence detector and the amplifier and configured to adjust the output of the amplifier in response to the presence signal, the controller being further configured to cause power to be simultaneously transmitted to two or more receiver devices within the coverage area and to subsequently register each of the two or more receiver devices.

2. The apparatus of claim 1, wherein:
   the presence detector is further configured to detect a human presence and to modify the presence signal to indicate the human presence or the human absence; and
   the controller is further configured to:
   adjust the power output of the amplifier to a high power level above a regulatory level when the presence signal indicates the human absence; and
   adjust the power output of the amplifier to at or below the regulatory level when the presence signal indicates the human presence.

3. The apparatus of claim 1, wherein the presence detector is selected from the group consisting of a motion detector, an infrared detector, and a combination thereof.

4. The apparatus of claim 1, wherein the controller is further configured to remove power from the amplifier when the presence signal indicates the absence of any receiver devices in the coverage area.

5. The apparatus of claim 1, wherein the controller is further configured to remove power from the amplifier following a time delay after the presence signal indicates the absence of any receiver devices in the coverage area.

6. The apparatus of claim 1, wherein the apparatus includes a computer and the transmit antenna is disposed on or in a back surface of a display of the computer.

7. The apparatus of claim 6, wherein the transmit antenna comprises a multi-turn loop.

8. The apparatus of claim 1, wherein the apparatus comprises a computer and the transmit antenna is disposed in a periphery around a display of the computer.

9. The apparatus of claim 1, wherein the transmit antenna is configured to create a coupling-mode region within a near field of the transmit antenna, the coupling mode region defined by the coverage area.

10. A method, comprising:
generating an electromagnetic field to wirelessly transfer power at a resonant frequency of a transmit antenna from the transmit antenna to a receive antenna of a receiver device in a coverage area of the transmit antenna;
detecting a presence of the receiver device within the coverage area in the absence of physical contact with the receiver device, of using the electromagnetic field, and of receiving data communication from the receiver device;
adjusting a power output of the transmit antenna in response to the presence of the receive antenna;
receiving power in the coverage area with the receive antenna disposed within the coverage area;
simultaneously transmitting power to two or more receiver devices within the coverage area; and
subsequently registering each of the two or more receiver devices.

11. The method of claim 10, further comprising:
detecting a human presence within a regulatory distance of the electromagnetic field;
adjusting the power output of the transmit antenna responsive to the human presence to a regulatory level or lower; and
adjusting the power output of the transmit antenna responsive to a human absence to a level above the regulatory level.

12. The method of claim 10, further comprising stopping generation of the electromagnetic field when the presence of any receiver devices in the coverage area is not detected.

13. The method of claim 10, further comprising stopping generation of the electromagnetic field following a time delay after the presence of any receiver devices in the coverage area is not detected.

14. The method of claim 10, wherein the generating comprises creating a coupling-mode region within a near field of the transmit antenna, the coupling mode region defined by the coverage area.

15. A method, comprising:
generating an electromagnetic field to wirelessly transfer power at a resonant frequency of a transmit antenna from the transmit antenna to a receive antenna of a receiver device in a coverage area of the transmit antenna;
repeating generation of the electromagnetic field with a repeater antenna to create a repeated coverage area different from the coverage area;
detecting a presence of the receiver device within the repeated coverage area in the absence of physical contact with the receiver device, of using the electromagnetic field, and of receiving data communication from the receiver device;
adjusting a power output of the transmit antenna in response to the presence of the receiver device;
receiving power from the repeated coverage area with the receive antenna disposed within the repeated coverage area;
simultaneously transmitting power to two or more receiver devices within the repeated coverage area; and
subsequently registering each of the two or more receiver devices.

16. The method of claim 15, further comprising:
detecting a human presence within a regulatory distance of the electromagnetic field;
adjusting the power output of the transmit antenna responsive to the human presence to a regulatory level or lower; and
adjusting the power output of the transmit antenna responsive to a human absence to a level above the regulatory level.

17. The method of claim 15, further comprising stopping generating of the electromagnetic field when the detecting indicates the absence of any receiver devices in the coverage area.

18. The method of claim 15, further comprising stopping generation of the electromagnetic field following a time delay after the presence of any receiver devices in the coverage area is not detected.

19. The method of claim 15, wherein the generating comprises creating a coupling-mode region within a near field of the transmit antenna, the coupling mode region defined by the coverage area.

20. A wireless power transfer system, comprising:
means for generating an electromagnetic field to wirelessly transfer power at a resonant frequency of a transmit antenna from the transmit antenna to a receive antenna of a receiver device in a coverage area of the transmit antenna;
means for detecting a presence of the receiver device within the coverage area in the absence of physical contact with the receiver device, of using the electromagnetic field, and of receiving data communication from the receiver device;
means for adjusting a power output of the transmit antenna in response to the presence of the receive antenna;
means for receiving power in the coverage area with the receive antenna disposed within the coverage area;
means for simultaneously transmitting power to two or more receiver devices within the coverage area; and
means for subsequently registering each of the two or more receiver devices.

21. The system of claim 20, further comprising:
means for detecting a human presence within a regulatory distance of the electromagnetic field;
means for adjusting the power output of the transmit antenna responsive to the human presence to a regulatory level or lower; and
means for adjusting the power output of the transmit antenna responsive to a human absence to a level above the regulatory level.

22. The system of claim 20, wherein the generating means stops generation of the electromagnetic field when the detecting means indicates the absence of any receiver devices in the coverage area.

23. The system of claim 20, wherein the generating means stops generation of the electromagnetic field following a time delay after the detecting means indicates the absence of any receiver devices in the coverage area.

24. A wireless power transfer system, comprising:
- means for generating an electromagnetic field to wirelessly transfer power at a resonant frequency of a transmit antenna from the transmit antenna to a receive antenna of a receiver device in a coverage area of the transmit antenna;
- means for repeating generation of the electromagnetic field with a repeater antenna to create a repeated coverage area different from the coverage area;
- means for detecting a presence of the receiver device within the repeated coverage area in the absence of physical contact with the receiver device, of using the electromagnetic field, and of receiving data communication from the receiver device;
- means for adjusting a power output of the transmit antenna in response to the presence of the receiver device;
- means for receiving power from the repeated coverage area with the receive antenna disposed within the repeated coverage area;
- means for simultaneously transmitting power to two or more receiver devices within the repeated coverage area; and
- means for subsequently registering each of the two or more receiver devices.

25. The system of claim 24, further comprising:
- means for detecting a human presence within a regulatory distance of the electromagnetic field;
- means for adjusting the power output of the transmit antenna responsive to the human presence to a regulatory level or lower; and
- means for adjusting the power output of the transmit antenna responsive to a human absence to a level above the regulatory level.

26. The system of claim 24, wherein the generating means stops generation of the electromagnetic field when the detecting means indicates the absence of any receiver devices in the coverage area.

27. The system of claim 24, wherein the generating means stops generation of the electromagnetic field following a time delay after the detecting means indicates the absence of any receiver devices in the coverage area.

* * * * *